(12) United States Patent
Kobilarov et al.

(10) Patent No.: US 11,360,477 B2
(45) Date of Patent: Jun. 14, 2022

(54) TRAJECTORY GENERATION USING TEMPORAL LOGIC AND TREE SEARCH

(71) Applicant: Zoox, Inc., Foster City, CA (US)

(72) Inventors: Marin Kobilarov, Mountain View, CA (US); Timothy Caldwell, Mountain View, CA (US); Vasumathi Raman, San Francisco, CA (US); Christopher Paxton, Mountain View, CA (US); Joona Markus Petteri Kiiski, Cupertino, CA (US); Jacob Lee Askeland, San Jose, CA (US); Robert Edward Somers, Sunnyvale, CA (US)

(73) Assignee: Zoox, Inc., Foster City, CA (US)

(*) Notice: Subject to any disclaimer, the term of this patent is extended or adjusted under 35 U.S.C. 154(b) by 37 days.

(21) Appl. No.: 16/908,389

(22) Filed: Jun. 22, 2020

(65) Prior Publication Data

US 2020/0387158 A1 Dec. 10, 2020

Related U.S. Application Data

(63) Continuation of application No. 16/193,801, filed on Nov. 16, 2018, now Pat. No. 10,691,127, which is a
(Continued)

(51) Int. Cl.
*G05D 1/00* (2006.01)
*B60W 30/09* (2012.01)
(Continued)

(52) U.S. Cl.
CPC ........... *G05D 1/0088* (2013.01); *B60W 30/09* (2013.01); *G01C 21/3407* (2013.01);
(Continued)

(58) Field of Classification Search
CPC .. G05D 1/0088; G05D 1/0055; G05D 1/0274; G05D 1/0212; G05D 1/022;
(Continued)

(56) References Cited

U.S. PATENT DOCUMENTS

| | | | |
|---|---|---|---|
| 5,177,685 | A | 1/1993 | Davis et al. |
| 6,707,421 | B1 | 3/2004 | Drury et al. |

(Continued)

FOREIGN PATENT DOCUMENTS

| | | |
|---|---|---|
| CN | 203032675 | 7/2013 |
| EP | 3217332 A1 | 9/2017 |

(Continued)

OTHER PUBLICATIONS

Office Action for U.S. Appl. No. 15/982,658, dated Feb. 3, 2021, Lee, "Vehicle Lighting State Determination", 32 pages.
(Continued)

*Primary Examiner* — Marthe Y Marc-Coleman
(74) *Attorney, Agent, or Firm* — Lee & Hayes, P.C.

(57) ABSTRACT

Techniques for determining a trajectory for an autonomous vehicle are described herein. In general, determining a route can include utilizing a search algorithm such as Monte Carlo Tree Search (MCTS) to search for possible trajectories, while using temporal logic formulas, such as Linear Temporal Logic (LTL), to validate or reject the possible trajectories. Trajectories can be selected based on various costs and constraints optimized for performance. Determining a trajectory can include determining a current state of the autonomous vehicle, which can include determining static and dynamic symbols in an environment. A context of an environment can be populated with the symbols, features, predicates, and LTL formula. Rabin automata can be based on the LTL formula, and the automata can be used to evaluate various candidate trajectories. Nodes of the MCTS
(Continued)

can be generated and actions can be explored based on machine learning implemented as, for example, a deep neural network.

20 Claims, 9 Drawing Sheets

Related U.S. Application Data continuation of application No. 15/632,147, filed on Jun. 23, 2017, now Pat. No. 10,133,275.

(60) Provisional application No. 62/465,724, filed on Mar. 1, 2017.

(51) Int. Cl.
| | |
|---|---|
| *G05D 1/02* | (2020.01) |
| *G01C 21/34* | (2006.01) |
| *G06N 3/04* | (2006.01) |
| *G06N 3/08* | (2006.01) |

(52) U.S. Cl.
CPC ......... *G05D 1/0055* (2013.01); *G05D 1/0212* (2013.01); *G05D 1/0223* (2013.01); *G05D 1/0272* (2013.01); *G05D 1/0274* (2013.01); *G06N 3/04* (2013.01); *G06N 3/08* (2013.01); *G05D 2201/0213* (2013.01)

(58) Field of Classification Search
CPC ......... G05D 1/0272; G05D 2201/0213; G06N 3/04; G06N 3/08; G01C 21/3407; B60W 30/09
See application file for complete search history.

(56) References Cited

U.S. PATENT DOCUMENTS

| | | | |
|---|---|---|---|
| 8,112,225 B2 | 2/2012 | Eidehall et al. | |
| 8,121,749 B1 | 2/2012 | Agrawal et al. | |
| 8,473,447 B2 | 6/2013 | Yoon et al. | |
| 8,620,517 B2* | 12/2013 | Caveney | G05D 1/0295 701/31.5 |
| 8,645,310 B2 | 2/2014 | Jiang et al. | |
| 8,880,272 B1 | 11/2014 | Ferguson et al. | |
| 9,381,916 B1 | 7/2016 | Zhu et al. | |
| 9,495,874 B1 | 11/2016 | Zhu et al. | |
| 9,507,347 B1 | 11/2016 | Ogale et al. | |
| 9,558,659 B1 | 1/2017 | Silver et al. | |
| 9,568,915 B1 | 2/2017 | Berntorp et al. | |
| 9,612,123 B1 | 4/2017 | Levinson et al. | |
| 10,059,334 B1 | 8/2018 | Zhu et al. | |
| 10,061,322 B1 | 8/2018 | Palefsky-Smith | |
| 10,387,736 B2 | 8/2019 | Wang et al. | |
| 2003/0187578 A1 | 10/2003 | Nishira et al. | |
| 2005/0049785 A1 | 3/2005 | Vergin | |
| 2011/0125344 A1 | 5/2011 | An et al. | |
| 2011/0205042 A1 | 8/2011 | Takemura et al. | |
| 2014/0324268 A1 | 10/2014 | Montemerlo et al. | |
| 2016/0201934 A1* | 7/2016 | Hester | F24F 11/62 700/276 |
| 2017/0031361 A1 | 2/2017 | Olson et al. | |
| 2017/0111262 A1* | 4/2017 | Imai | H04L 45/123 |
| 2017/0131719 A1 | 5/2017 | Micks et al. | |
| 2017/0192426 A1 | 7/2017 | Rust | |
| 2017/0192437 A1 | 7/2017 | Bier et al. | |
| 2017/0193338 A1 | 7/2017 | Huberman et al. | |
| 2017/0213459 A1 | 7/2017 | Ogaz | |
| 2017/0277195 A1* | 9/2017 | Frazzoli | B60W 60/0011 |
| 2017/0364758 A1 | 12/2017 | Minster | |
| 2018/0068191 A1 | 3/2018 | Biemer et al. | |
| 2018/0089563 A1* | 3/2018 | Redding | G05D 1/0088 |
| 2018/0095465 A1 | 4/2018 | Gao et al. | |
| 2018/0137380 A1 | 5/2018 | Alrefai et al. | |
| 2018/0141544 A1* | 5/2018 | Xiao | G08G 1/164 |
| 2018/0144202 A1 | 5/2018 | Moosaei et al. | |
| 2018/0148051 A1 | 5/2018 | Lujan et al. | |
| 2018/0164816 A1 | 6/2018 | Hashimoto et al. | |
| 2018/0224860 A1 | 8/2018 | Warshauer-Baker et al. | |
| 2018/0251126 A1 | 9/2018 | Linscott et al. | |
| 2019/0025841 A1 | 1/2019 | Haynes et al. | |
| 2019/0051069 A1 | 2/2019 | Cooley | |
| 2019/0061765 A1 | 2/2019 | Marden et al. | |
| 2019/0092318 A1 | 3/2019 | Mei et al. | |
| 2019/0101919 A1 | 4/2019 | Kobilarov et al. | |
| 2019/0122059 A1 | 4/2019 | Zhou et al. | |
| 2019/0244058 A1 | 8/2019 | Franca-Neto | |
| 2019/0250626 A1 | 8/2019 | Ghafarianzadeh et al. | |
| 2019/0272750 A1 | 9/2019 | Fukumoto et al. | |
| 2019/0308620 A1 | 10/2019 | Sapp et al. | |
| 2019/0329769 A1 | 10/2019 | Shalev-Shwartz et al. | |
| 2019/0344804 A1 | 11/2019 | Motomura et al. | |
| 2019/0354786 A1 | 11/2019 | Lee et al. | |
| 2019/0359208 A1 | 11/2019 | Sapp et al. | |
| 2019/0361443 A1 | 11/2019 | Linscott et al. | |
| 2019/0384294 A1 | 12/2019 | Shashua et al. | |
| 2020/0086855 A1 | 3/2020 | Packer et al. | |
| 2020/0110416 A1 | 4/2020 | Hong et al. | |
| 2020/0160530 A1 | 5/2020 | Mehnert et al. | |
| 2021/0208598 A1 | 7/2021 | Ghafarianzadeh et al. | |

FOREIGN PATENT DOCUMENTS

| | | |
|---|---|---|
| GB | 2547082 A | 8/2017 |
| JP | 2008129804 A | 6/2008 |
| JP | 2016210255 A | 12/2016 |
| WO | WO2016062568 A1 | 4/2016 |
| WO | WO2016130719 | 8/2016 |
| WO | WO2017091690 A1 | 6/2017 |

OTHER PUBLICATIONS

Office Action for U.S. Appl. No. 16/512,195, dated Jul. 21, 2021, Linscott, "Trajectory Generation and Execution Architecture", 9 pages.
U.S. Appl. No. 15/632,208, filed Jun. 23, 2017, Linscott, et al., "Trajectory Generation and Execution Architecture", 63 pages.
Anonymous "Outline of machine learning—Wikipedia", Mar. 27, 2018, Retrieved from the Internet: URL:https://en.wikipedia.org/w/index.php?title=Outline of machine learning&oldid=832722436, retrieved on Jul. 9, 2019, section entitled "Machine learning methods", 28 pages.
Broadhurst et al., "Monte Carlo Road Safety Reasoning", Proc IEEE Intelligent Vehicles Symposium, Jun. 2005, 6 pgs.
Gu et al, "On-Road Motion Planning for Autonomous Vehicles", Proc 5th intl conf on Intelligent Robotics and Applications, vol. Part III, ICIRA Oct. 2012, 10 pgs.
Heinemann, "Predicting Cut-Ins in Traffic Using a Neural Network", Master's thesis in Systems, Control and Mechatronics, Jan. 1, 2017, Retrieved from the Internet: URL:https://pdfs.semanticscholar.org/be17/0747667db2db224ccbe3f909ad99de14c78a.pdf [retrieved on Jul. 9, 2019], section 5.1 & 6, 60 pgs.
McMahon et al., "Sampling-Based Tree Search with Discrete Abstractions for Motion Planning with Dynamics and Temporal Logic", IEEE/RSJ Intl Conf on Intelligent Robots and Systems, Sep. 2014, 9 pgs.
Final Office Action dated Mar. 2, 2020 for U.S. Appl. No. 16/536,228 "Feature-Based Prediction", Sapp, 6 pages.
Office Action for U.S. Appl. No. 15/833,715, dated Oct. 2, 2019, Kobilarov et al., "Trajectory Prediction of Third-Party Objects Using Temporal Logic and Tree Search", 12 pages.
Office Action for U.S. Appl. No. 16/193,801, dated Oct. 24, 2019, Kobilarov, "Trajectory Generation Using Temporal Logic and Tree Search", 8 pages.
Non Final Office Action dated Dec. 16, 2019 for U.S. Appl. No. 15/982,658 "Vehicle Lighting State Determination" Lee, 30 pages.
Final Office Action dated Apr. 27, 2020 for U.S. Appl. No. 15/982,658 "Vehicle Lighting State Determination" Lee, 32 pages.

(56) References Cited

OTHER PUBLICATIONS

Office Action for U.S. Appl. No. 15/632,147, dated Apr. 30, 2018, Kobilarov et al., "Trajectory Generation Using Temporal Logic and Tree Search", 6 pages.
Non Final Office Action dated May 18, 2020 for U.S. Appl. No. 15/897,028 "Detecting Blocking Objects" Ghafarianzadeh, 21 pages.
Office Action for U.S. Appl. No. 16/536,228, dated Sep. 26, 2019, Sapp et al., "Feature-Based Prediction", 6 pages.
The PCT Invitation to Pay Additional Fees dated Jun. 6, 2018 for PCT application No. PCT/US2018/019685, 12 pages.
The PCT Search Report and Written Opinion dated Jul. 17, 2019, for PCT Application No. PCT/US2019/025226, 13 pages.
The PCT Search Report and Written Opinion dated Apr. 15, 2019, for PCT Application No. PCT/US2019/016407, 11 pages.
The PCT Search Report and Written Opinion dated Jul. 30, 2018, for PCT Application No. PCT/US18/19685, 17 pages.
The PCT Search Report and Written Opinion dated Aug. 22, 2019 for PCT Application No. PCT/US2019/031057, 8 pages.
Wongpiromsarn et al., "Receding Horizon Temporal Logic Planning", IEEE Transactions on Automatic Control, vol. 57, Issue 11, Nov. 2012, 14 pgs.
Non Final Office Action dated Sep. 9, 2020 for U.S. Appl. No. 16/536,228, "Feature-Based Prediction", Sapp, 7 pages.
Non Final Office Action dated Aug. 13, 2020 for U.S. Appl. No. 15/982,658, "Vehicle Lighting State Determination", Lee, 33 pages.
Office Action for U.S. Appl. No. 16/512,195, dated Dec. 17, 2021, Linscott, "Trajectory Generation and Execution Architecture", 10 pages.
Japanese Office Action dated Feb. 1, 2022 for Japanese Patent Application No. 2019-547445, a foreign counterpart to U.S. Pat. No. 10,353,390, 13 pages.

* cited by examiner

TRAJECTORY GENERATION USING TEMPORAL LOGIC AND TREE SEARCH

CROSS REFERENCE TO RELATED APPLICATION

This is a continuation application which claims priority to commonly assigned, co-pending U.S. patent application Ser. No. 16/193,801, filed Nov. 16, 2018, which is a continuation of U.S. patent application Ser. No. 15/632,147, filed Jun. 23, 2017, now U.S. Pat. No. 10,133,275 issued Nov. 20, 2018, which claims priority filing benefit from U.S. Provisional Patent Application No. 62/465,724, filed Mar. 1, 2017. Application Ser. Nos. 16/193,801, 15/632,147, 62/465,724 and U.S. Pat. No. 10,133,275 are fully incorporated herein by reference.

BACKGROUND

Various methods, apparatuses, and systems are utilized by autonomous vehicles to guide such autonomous vehicles through environments including various static and/or dynamic objects. For instance, autonomous vehicles utilize route planning methods, apparatuses, and systems to guide autonomous vehicles through congested areas with other moving vehicles (autonomous or otherwise), moving people, stationary buildings, etc. In some examples, the behavior of other objects in an environment and road conditions can be unpredictable.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
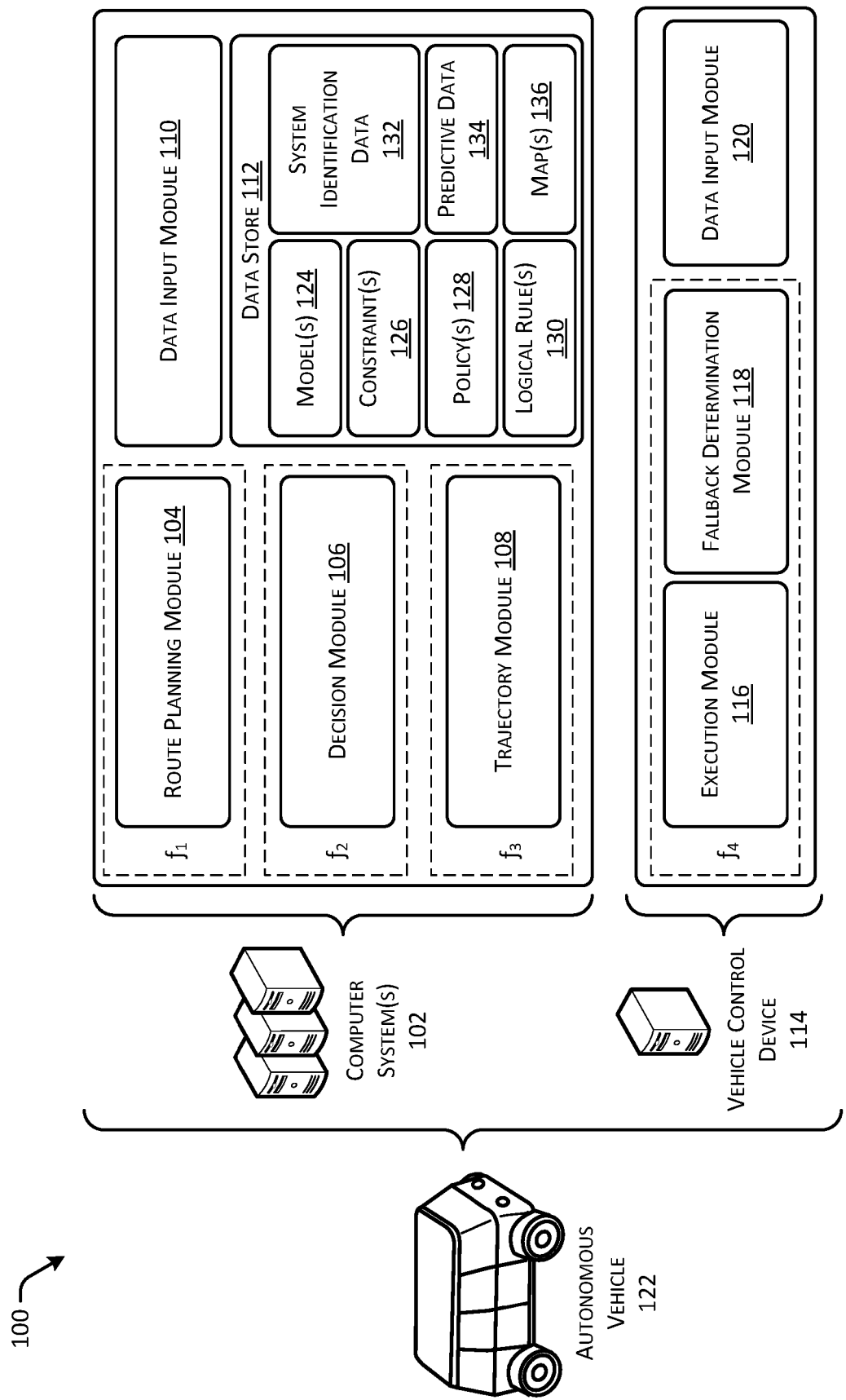
FIG. 1 illustrates an example architecture for generating and executing trajectories to control an autonomous vehicle, as described herein.

This disclosure describes methods, apparatuses, and systems for generating trajectories for an autonomous vehicle using temporal logic (LTL) and tree search. In at least one example, the methods, apparatuses, and systems described herein are directed to heuristic-guided tree search with temporal logic constraints for generating trajectories for autonomous vehicles. In some examples, the methods, apparatuses, and systems described herein are directed to planning algorithms combining learned low-level options with learned high level policies over options for Task and Motion Planning (TAMP) in dynamic environments, and a framework for incorporating complex task requirements expressed in temporal logic as applied to policy-learning for autonomous vehicles. In some examples described in detail below, reinforcement learning with deep neural networks can be applied to task and motion planning in complex dynamic environments. In those examples, planning problems can be expressed in terms of a set of temporal logic (e.g., Linear Temporal Logic (LTL) or Signal Temporal Logic (STL)) constraints and a reward function. Additionally, or in the alternative, search algorithms, such as a Monte Carlo Tree Search (MCTS), with neural network control policies are incorporated to leverage machine learning and tree search to explore possible actions for trajectory generation. In some examples, MCTS action selection and LTL formula model checking can be incorporated in an autonomous driving task, where a vehicle is configured to drive down a road in traffic, avoid collisions, and navigate an intersection, all while obeying the rules of the road. The use of such a strategy can improve computer performance requiring less memory, as well as having a decreased processing requirement, thus enabling such a system to be employed in real world autonomous vehicle safety systems having to make critical safety decisions in short amounts of time with limited amounts of processing power and memory space.

TAMP approaches seek to combine high-level, "STRIPS" (e.g., Stanford Research Institute Problem Solver)-style logical planning with continuous space motion planning. As can be appreciated, in the context of autonomous vehicle controls, a problem frequently encountered is that the combination of the discrete and continuous portions of the state space corresponding to speculative actions tends to explode in size for complex problems. The addition of temporal constraints makes searching for an optimal solution more difficult. In general, integrating various methods into a planning framework that results in reliable robot or autonomous vehicle behavior has been an open question of optimized implementation.

In some examples, planning can be achieved by using neural networks to learn both low-level control policies and high-level action selection conditions, and then using these multi-level policies as part of a heuristic search algorithm to achieve a complex task, such as determining a trajectory for an autonomous vehicle. In particular, tasks can be specified in an expressive temporal logical specification, and can require reacting to a changing environment. An example representation to enable such logical specification of desired (and undesired) behaviors is Linear Temporal Logic (LTL). In examples which employ LTL, the continuous action parametrization, as well as their sequencing, can be optimized to adhere to the specifications defined.

In some examples, tasks and motion planning can be formulated as an instance of Monte Carlo Tree Search (MCTS), where each high-level option is represented by a learned control policy trained on a set of Linear Temporal Logic (LTL) formulas. In those examples, a good tree search policy can be defined, for which two complementary levels of reinforcement learning are used. In some examples, prior information from expert demonstrations can be used to initialize this search with "good" high-level discrete action distributions. In still other examples, such an initialization of data can be from machine learning algorithms.

In general, determining a trajectory for an autonomous vehicle can include utilizing a tree search algorithm such as Monte Carlo Tree Search (MCTS) to organize and search through possible trajectories, while using temporal logic formulas, such as Linear Temporal Logic (LTL), to verify whether the possible trajectories satisfy rules of the road, for example, and determining various costs and constraints associated with possible trajectories to select a trajectory to optimize performance. In some instances, determining a trajectory of an autonomous vehicle can include determining a current state of the vehicle, which can include determining static symbols and dynamic symbols which represent objects in an environment. For example, and without limitation, static symbols can include stop regions proximate to a stop sign, lane regions defining a lane of a road for the autonomous vehicle to traverse, static objects (e.g., buildings, obstacles, parked vehicles, etc.) or any region of space or state of the world (e.g., such as Washington or California), etc. Dynamic symbols can represent other entities whose attributes change over time, examples of which include other dynamic objects such as other vehicles, trains, pedestrians, bicyclists, etc.

Once static symbols and/or dynamic symbols are determined (e.g., from a map or a perception system), processing can include determining features based on the symbols. In some instances, features can include statements based on symbols, whereby the statements can return a number, such as a determination that an autonomous vehicle is 5 meters away from a stop region.

As an initial state (e.g., a context) is populated with symbols and features, additional elements referred to as predicates can be instantiated based on the current symbols and features. For example, and without limitation, predicates can include logical statements based on symbols that return values (e.g., Boolean values such as True or False, or continuous values indicating a degree of satisfaction of a statement). In one example where a symbol is an autonomous vehicle under control of the current system, a predicate can evaluate as True or False based on whether the autonomous vehicle is in a stop region or not (e.g., proximate to a stop sign).

As symbols, features, and predicates are added to a context indicating a state of an environment at an instant in time, processing can include determining temporal logic formulas, such as Linear Temporal Logic (LTL) formulas or Signal Temporal Logic (STL) formulas, that can be evaluated based on the present symbols, features, and/or predicates. As discussed throughout this disclosure, temporal logic can be used to model or encode formulas about the future of paths or objects, and whether conditions will eventually be true, whether a condition will be true until another fact becomes true, etc. In some instances, the temporal logic formulas can include statements about the world that reflect proper driving behavior for an autonomous vehicle, for example. As candidate routes and trajectories are generated for the autonomous vehicles, the routes and trajectories can be evaluated using the temporal logic formulas to determine if the trajectories satisfy the temporal logic formulas, in which case, trajectories can be rejected, or evaluated with respect to other costs and constraints to select the highest performing trajectory.

In some instances, an LTL formula can be evaluated to determine if the formula is violated or not (e.g., as a Boolean result). By way of another example, a temporal logic formula (such as STL) can be evaluated to provide an indication of how well a condition is satisfied while determining a cost for violating a condition (e.g., assigning a penalty to a state as a function of how far an autonomous vehicle stops beyond a stop line, in addition to or instead of assigning a Boolean value to the condition). Additional aspects of the temporal logic formulas are discussed throughout this disclosure.

As a context of an environment and an autonomous vehicle is determined (e.g., including the various symbols, features, predicates, temporal logic formula, etc.), some or all of the context can be used to generate one or more automaton, which can correspond to a finite state machine that accepts trajectories as inputs to evaluate a cost of the trajectory and/or to evaluate whether the trajectory violates any temporal logic formula associated with the one or more automaton. As used herein, references to "automata" may include one or more automaton.

Starting with an initial state (e.g., the context or automata), candidate trajectories can be evaluated using one or more tree search algorithms, such as a Monte Carlo Tree Search (MCTS) algorithm. For example, various possible trajectories can be modeled and stored as part of a MCTS search, and compared against the LTL formulas and/or evaluated to determine costs associated with various actions. For example, as the MCTS unfolds, a snapshot (e.g., representing the context or automata) can evolve the context based on changing conditions (e.g., over time, as objects move, based on a speculative action, etc.), and the snapshot can be checked for compliance with the various LTL formulas. If multiple trajectories are determined not to violate the LTL formula(s), a trajectory with a lowest cost (or a highest performance, comfort, etc.) can be selected. For example, for various operations of the autonomous vehicle, or for various possible trajectories, a cost function can penalize acceleration, jerk, lateral acceleration, yaw, steering angle, steering angle rate, etc.

In some instances, machine learning can be used to more accurately determine possible trajectories to investigate using the MCTS based on a current state and/or learned trajectories in response to the current state(s) and/or tasks to be completed. For example, based on a current state of an environment, the MCTS, coupled with machine learning for action exploration and selection, can determine candidate trajectories that are most likely to result in satisfactory outcomes based on learned low-level policies (e.g., how to travel in a road lane, how to change lanes, how to stop, how not to tailgate, etc.) and learned high-level policies (e.g., previously selected actions (e.g., trajectories, decisions, commands, etc.) with good outcomes). As may be understood, "good outcomes" may correspond to safe completion of tasks (e.g., driving from point A to point B) that are efficient and comfortable.

As mentioned above, the trajectory planning operations and systems described herein can improve a functioning of a computing device implemented in an autonomous vehicle by providing a robust framework by which planning decisions can be made in real time to optimize performance of the autonomous vehicle. In some instances, machine learning algorithms can be used to determine which potential trajectories to evaluate based on a known current state and/or goal. By utilizing machine learning and/or by utilizing MCTS, the operations can quickly and efficiently determine a trajectory that is safe and that maximizes performance based on costs and constraints. In some instances, determining static and dynamic symbols and determining a current state using features, predicates, LTL formulas, and automata can reduce an amount of memory and/or increase processing performance by operating on situationally relevant data. In some instances, quickly determining a trajectory based on optimizing safety, costs, and performance can correspond to improved safety outcomes and/or increased comfort for occupants of an autonomous vehicle. These and other improvements to the functioning of the computer are discussed herein.

The methods, apparatuses, and systems described herein can be implemented in a number of ways. Example implementations are provided below with reference to the following figures. Although discussed in the context of an autonomous vehicle, the methods, apparatuses, and systems described herein can be applied to a variety of systems requiring autonomous or semi-autonomous control, such as industrial robots or unmanned aerial vehicles. For example, the methods, apparatuses, and systems can be utilized in a manufacturing assembly line context, in an aerial surveying context, etc. Additionally, the techniques described herein can be used with real data (e.g., captured using sensor(s)), simulated data (e.g., generated by a simulator), or any combination of the two.

FIG. 1 illustrates an example architecture 100 for generating and executing trajectories to control autonomous vehicles, as described herein. For example, the architecture 100 can include computer system(s) 102 including various hardware and/or software to implement aspects of the systems, methods, and apparatuses described herein. For example, the computer system(s) 102 can include a route planning module 104, a decision module 106, a trajectory module 108, a data input module 110, and a data store 112. Additionally, the architecture 100 can include a vehicle control device 114 including various hardware and/or software to implement aspects of the systems, methods, and apparatuses described herein. In some examples, the vehicle control device 114 can be a separate and distinct computer system, which can include an execution module 116, a fallback determination module 118, and a data input module 120. In some examples, the computer system 102 may comprise the vehicle control device 114.

In some examples, the computer system(s) 102 and vehicle control device 114 can be embodied in an autonomous vehicle 122, or any other type of transportable computer system. In other examples, the computer system(s) 102 can be remotely located from the autonomous vehicle 122 and the vehicle control device 114 can be embodied in the autonomous vehicle 122. In some instances, the computer system(s) 102 can provide planning functionality for the autonomous vehicle 122 and the vehicle control device 114 can provide execution functionality for the autonomous vehicle 122, as described herein.

As described above, the computer system(s) 102 can include a route planning module 104, a decision module 106, a trajectory module 108, a data input module 110, and a data store 112. In at least one example, individual modules of the modules (e.g., the route planning module 104, the decision module 106, and the trajectory module 108) can have different frequencies of operation. As illustrated in FIG. 1, the route planning module 104 can have a first frequency of operation (e.g., $f_1$), the decision module 106 can have a second frequency of operation (e.g., $f_2$), and the trajectory module 108 can have a third frequency of operation (e.g., $f_3$). In at least one example, the first frequency can be the lowest frequency (e.g., 10 Hertz) and the third frequency can be the highest frequency (e.g., 100 Hertz). That is, in at least one example, the route planning module 104 can process data at a lower speed than the decision module 106, which can process data at a lower speed than the trajectory module 108. The different frequencies can enable the architecture 100 to distribute computational resources to modules based on a frequency in which individual modules receive updated data and/or a time period in which individual modules need to process and output data.

The route planning module 104 can be configured to determine a most efficient route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. In at least one example, the route planning module 104 can perform a search, such as a graph search, on top of a map to identify a route to guide the autonomous vehicle 122 from a first location to a second location. For the purpose of this discussion, a map can be any number of data structures modeled in two dimensions or three dimensions that are capable of providing information about an environment, such as, but not limited to, topologies (such as intersections), streets, mountain ranges, roads, terrain, and the environment in general. In at least one example, the route planning module 104 can utilize a graph traversal algorithm to identify a route to guide an autonomous vehicle from a first location to a second location. Graph traversal algorithms can include algorithms for unweighted graphs (e.g., breadth first search, depth first search, greedy best first, A* search, etc.) and/or weighted graphs (e.g., Dijkstra's algorithm, weighted A* search, etc.).

In some examples, the route planning module 104 can identify two or more candidate routes for guiding the autonomous vehicle 122 from the first location to the second location. In such examples, the route planning module 104 can rank the two or more candidate routes based on route planning constraint(s). Route planning constraint(s) can include rules of the road, travel time, travel distance, etc. In at least one example, the route planning module 104 can determine that a top-ranking candidate route is the route for guiding the autonomous vehicle 122 from the first location to the second location. The route planning module 104 can output a sequence of waypoints corresponding to the route to the decision module 106.

In at least one example, the decision module 106 can receive the route (e.g., the sequence of waypoints) and can generate an instruction for guiding the autonomous vehicle 122 along at least a portion of the route from the first location to the second location. In at least one example, the decision module 106 can determine how to guide the autonomous vehicle 122 from a first waypoint in the sequence of waypoints to a second waypoint in the sequence of waypoints. In some examples, the instruction can be a trajectory, or a portion of a trajectory. In such examples, the decision module 106 can generate a sequence of actions (e.g., drive down the road, accelerate, change lanes, turn left, etc.) to guide the autonomous vehicle 122 along the route. In other examples, the instruction can be a policy. A policy can be used to determine a trajectory of the autonomous vehicle 122 based on real-time processed sensor data received from sensor(s) on the autonomous vehicle 122.

In at least one example, the decision module 106 can utilize one or more models and/or algorithms to determine an instruction for guiding the autonomous vehicle 122 from the first location to the second location in view of constraint(s). For instance, in at least one example, the decision module 106 can utilize a combination of temporal logic (e.g., linear temporal logic (LTL), signal temporal logic (STL), etc.) and a search algorithm (e.g., policy tree search, Monte Carlo Tree Search (MCTS), exhaustive search, etc.) to determine one or more candidate instructions and evaluate a performance of each of the potential instructions prior to determining which instruction to select. Additional details associated with the decision module 106 are described in FIG. 2, below. The decision module 106 can output the instruction to the trajectory module 108.

In at least one example, the decision module 106 can determine a fallback instruction. The fallback instruction can be an instruction that the autonomous vehicle 122 is to follow when an event warranting a fallback action, described below, occurs. In such an example, the decision module 106 can provide the fallback instruction to the trajectory module 108 and/or the fallback determination module 118. In some examples, the decision module 106 can provide a fallback instruction to the trajectory module 108 and/or the fallback determination module 118 at the same time that the decision module 106 provides an instruction to the trajectory module 108 (i.e., the decision module 106 can provide two instructions to the trajectory module 108). In other examples, the decision module 106 can provide a fallback instruction to the trajectory module 108 and/or the fallback determination module 118 at different times than when the decision module 106 provides an instruction to the trajectory module 108.

In some examples, the decision module 106 can have a limited amount of time to output an instruction. That is, in at least one example, the decision module 106 can receive an interrupt requesting an instruction and the decision module 106 can provide an instruction responsive to receiving the interrupt. Furthermore, processing the route to generate an instruction can be computationally expensive. Accordingly, in at least one example, the decision module 106 can operate at a higher frequency than the route planning module 104, as described above. In at least one example, the decision module 106 can operate at a frequency that is lower than the frequency required for real-time decision making performed by the trajectory module 108. As a non-limiting example, the decision module 106 can operate at 10 Hertz, whereas the route planning module 104 can operate at one Hertz and the trajectory module 108 can operate at 30 Hertz.

The trajectory module 108 can receive the instruction and can optimize the instruction based on objects identified in the environment. In at least one example, the trajectory module 108 can access, receive, and/or determine real-time processed sensor data to determine object(s) in the environment which the autonomous vehicle 122 is travelling. In the at least one example, the trajectory module 108 can process the instruction in view of the real-time processed sensor data.

In an example where the instruction is a trajectory, the trajectory module 108 can leverage model(s) and/or algorithm(s), constraint(s), and/or cost(s) to optimize the trajectory. For instance, the trajectory module 108 can utilize model(s) and/or algorithm(s) including, but not limited to, differential dynamic programming, interior point optimization, sequential quadratic programming, etc. to refine the trajectory. In at least one example, the constraint(s) can include, but are not limited to, cost(s), comfort, safety, rules of the road, etc. In at least one example, the cost(s) can include, but are not limited to, performance (e.g., speed), minimizing lateral acceleration, positioning in a lane, etc. In at least one example, the model(s) and/or algorithm(s) can include bi-directionality. In such an example, a velocity of the autonomous vehicle 122 can be optimized to include a positive, a negative, or a zero value. In at least one example, a rotation of the autonomous vehicle 122 can be described using Euclidian matrices. As a result, a same model and/or algorithm can be used for optimizing a trajectory having different types of waypoints (e.g., road, intersection, roundabout, etc.). Based at least in part on processing the trajectory, in view of the real-time processed sensor data, the trajectory module 108 can generate an output trajectory.

In an example where the instruction is a policy, the trajectory module 108 can leverage model(s) and/or algorithm(s), constraint(s), and/or cost(s) to generate a trajectory based on the policy and real-time processed sensor data. For instance, the trajectory module 108 can utilize model(s) and/or algorithm(s) including, but not limited to, differential dynamic programming, interior point optimization, sequential quadratic programming, etc. to generate a trajectory based on the policy. For the purpose of this discussion, the trajectory can be called an output trajectory.

As described above, the trajectory module 108 can access, receive, and/or determine real-time processed sensor data. The trajectory module 108 can leverage the real-time processed sensor data to generate an output trajectory. The trajectory module 108 can utilize a more detailed model of the autonomous vehicle 122 than the decision module 106. Processing that utilizes such a detailed model can be computationally expensive. Additionally, the trajectory module 108 can output an output trajectory within a predetermined amount of time after receiving the real-time processed sensor data. For instance, in at least one example, the trajectory module 108 can receive an interrupt requesting an output trajectory and the trajectory module 108 can provide an output trajectory responsive to receiving the interrupt. In some examples, the trajectory module 108 can have less time to output an output trajectory than the decision module 106 has to output a trajectory, in order to account for obstacles (e.g., another vehicle, pedestrian, etc.) or conditions. Accordingly, the trajectory module 108 can operate at a higher frequency than the route planning module 104 and/or the decision module 106, as described above.

In at least one example, the trajectory module 108 can receive a fallback instruction from the decision module 106. In such examples, the trajectory module 108 can generate an output fallback trajectory based on processing the fallback instruction in a substantially similar manner as described above. In some examples, as described above, the trajectory module 108 can output the output trajectory and the output fallback instruction at the same time.

The data input module 110 can receive input from one or more sensors on the autonomous vehicle 122. In at least one example, the autonomous vehicle 122 can have one or more sensors which can include light detection and ranging (LIDAR) sensors for capturing LIDAR data for segmentation and/or classification, camera sensors for capturing vision data for image segmentation and/or classification, radio detection and ranging (RADAR) sensors for capturing range, angle, and/or velocity of objects in an environment, sound navigation and ranging (SONAR) sensors for capturing acoustic information of objects in an environment, etc. In at least one example, the data input module 110 can receive data from each of the sensors (e.g., LIDAR sensors, camera sensors, RADAR sensors, SONAR sensors, etc.) described above and can process the data to identify objects and determine information about the objects in the environment. Additionally, the autonomous vehicle 122 can include ultrasonic transducers, wheel encoders, microphones, inertial measurement unit(s) (IMU), accelerometers, gyroscopes, magnetometers, temperature sensors, humidity sensors, light sensors, global positioning system (GPS) sensors, etc. The data input module 110 can process data received from the one or more sensors to determine a state of the autonomous vehicle 122 at a particular time. That is, the data input module 110 can process data received from the one or more sensors to determine a position of the autonomous vehicle 122 at a particular time, an orientation of the autonomous vehicle 122 at a particular time, a velocity of the autonomous vehicle 122 at a particular time, etc. In at least one example, the one or more sensors and the data input module 110 may be associated with a perception system for performing data analysis such as segmentation and classification. As described below, such data (e.g., real-time processed sensor data) can be used by the trajectory module 108 for generating output trajectories. Additionally, such data (e.g., real-time processed sensor data) can be used by the route planning module 104 for planning routes and/or the decision module 106 for generating instructions.

The data store 112 can store data so that it can be organized, updated, and accessed. In at least one example, the data store 112 can include model(s) 124, constraint(s) 126, policy(s) 128, logical rule(s) 130, system identification data 132, predictive data 134, map(s) 136, etc. The model(s) 124 can include model(s) of the autonomous vehicle 122, model(s) of other objects in the environment, decision model(s), etc.

Any number of vehicle models can be used with the systems and methods discussed herein. In some examples, a vehicle model having coarse discretizations of possible actions and/or predicted steering angle can be used. The choice of a particular vehicle model can be made to generate feasible trajectories that could be executed by an autonomous vehicle.

In one example, the state of each road world entity, can be defined by $w_i = [p_x, p_y, \theta, v, \psi]$, where $(p_x, p_y)$ are the vehicle's inertial coordinates, $\theta$ its bearing, and $v$ its linear velocity. Further, a road world control input can comprise one or more of an acceleration $a$ and a steering angle rate $\dot\psi$, such that $u = [u_1, u_2] := (a, \dot\psi)$, though any number of other control inputs are contemplated.

Continuing in such an example, dynamics of the planning agent (e.g., the autonomous vehicle) can be modeled as:

$$\dot p_x = v\cos\theta \tag{1}$$

$$\dot p_y = v\sin\theta \tag{2}$$

$$\dot\theta = \frac{v}{L}\tan\psi \tag{3}$$

$$\dot v = u_1 \tag{4}$$

$$\dot\psi = u_2 \tag{5}$$

where L is the vehicle wheelbase length. In some examples, a fixed time step of 0.1 seconds can be used for learning and for all experiments, though any other time step is contemplated. As can be understood, in some examples, dynamics of the autonomous vehicles can be stored as one of the model(s) 124.

The constraint(s) 126 can include cost(s), comfort, safety, rules of the road, etc. The policy(s) 128 can include manual policies, learned policies, control policies, option policies, etc. Example policies include, but are not limited to, a minimum distance to maintain from other vehicles, maximum acceleration rates, driving rules (e.g., stay within a lane, don't cross double yellow lines, etc.), and the like. The logical rule(s) 130 can include reasoned rules of the road, etc. The system identification data 132 can include information about the autonomous vehicle 122 over time. The predictive data 134 can include one or more snapshots of the autonomous vehicle 122 at future time(s), and/or can include predictions of behavior of other dynamic objects (e.g., other vehicles) proximate to the autonomous vehicle 122 at future time(s). The map(s) 136 can include data structures modeled in two dimensions or three dimensions that are capable of providing information about an environment, such as, but not limited to, topologies (such as intersections), streets, mountain ranges, roads, terrain, and the environment in general.

As described above, the vehicle control device 114 can be a separate and distinct computer system, which can include an execution module 116, a fallback determination module 118, and a data input module 120. In some examples, the vehicle control device 114 can access the data input module 110 and/or data store 112 associated with the computer system(s) 102.

The execution module 116 can receive the output trajectory from the trajectory module 108 and can compute commands for actuating steering and acceleration of the autonomous vehicle 122 to enable the autonomous vehicle 122 to follow the output trajectory. In at least one example, the execution module 116 can receive the output trajectory and can compute a steering angle and velocity to enable the autonomous vehicle 122 to follow the output trajectory. A non-limiting example of an algorithm that the execution module 116 can use is provided below.

$$\delta = -P^* ela \tag{6}$$

$$ela = e + xla^*\sin(\Delta\Psi) \tag{7}$$

In equations (6) and (7) above, a gain (e.g., a predetermined constant value) is represented by P, lateral error is represented by e, lookahead error is represented by ela, heading error is represented by $\Delta\Psi$, lookahead distance (parameter) is represented by xla, and steering angle is represented by $\delta$.

The fallback determination module 118 can access, receive, and/or generate fallback trajectory(s). As described above, a fallback trajectory can be a trajectory that the autonomous vehicle 122 is to follow responsive to determining an occurrence of an event warranting a fallback action. In at least one example, an event can be a problem with the computer system(s) 102. For instance, a sensor associated with the computer system(s) 102 can fail or a component of the autonomous vehicle 122 can malfunction (e.g., tire pops, windshield shatters, etc.). Or, an event can be associated with a lack of communication from the computer system(s) 102 and/or of responsiveness of the computer system(s) 102. In some examples, an event can be an object that is within a threshold distance of the autonomous vehicle 122, an object that is predicted to be within a threshold distance of the autonomous vehicle 122, or a probability of an accident (i.e., collision) exceeding a threshold probability. Moreover, in at least one example, an event can be associated with an occupancy status of the autonomous vehicle 122. An occupancy status of the autonomous vehicle 122 can indicate when a passenger in the autonomous vehicle 122 becomes incapacitated, when a passenger (or object associated with a passenger) is defenestrated from the autonomous vehicle 122, etc. Furthermore, an event can be associated with a status of a drivable surface associated with the autonomous vehicle 122. The status of the drivable surface can indicate when a drivable surface is impassible (e.g., a bridge has collapsed, weather has caused an impassible condition, etc.). In yet additional and/or alternative examples, an event can be associated with a level of confusion associated with the computer system(s) 102 exceeding a confusion threshold. For instance, the computer system(s) 102 can receive real-time processed sensor data and may not be able to identify one or more objects in the environment surrounding the autonomous vehicle 122, which can indicate a level of confusion.

In at least one example, a fallback trajectory can correspond to a fallback action, which may correspond to a safety maneuver, such as aggressively stopping the autonomous vehicle 122, driving to the shoulder of the road and stopping, etc. In some examples, the fallback action may not be "smooth" to a passenger, but may safely navigate a situation responsive to an occurrence of an event. In some examples, the fallback determination module 118 can receive an output fallback trajectory from the decision module 106 and/or the trajectory module 108. In such examples, the fallback determination module 118 can store the output fallback trajectory for a predetermined period of time, until a new output fallback trajectory is received, etc. In other examples, the fallback determination module 118 can generate a fallback trajectory based at least in part on real-time processed sensor data and/or hard-coded rule(s). In at least one example, a fallback trajectory can be determined based on a type of event. That is, different events can warrant different fallback actions.

In at least one example, the fallback determination module 118 can determine that the autonomous vehicle 122 is about to collide with an obstacle. That is, the fallback determination module 118 can leverage real-time processed sensor data to determine that an object is within a threshold distance of the autonomous vehicle 122. Based at least in part on determining that the autonomous vehicle 122 is about to collide with the obstacle, the fallback determination module 118 can access and/or generate a fallback trajectory which causes the autonomous vehicle 122 to perform a fallback action. Additionally and/or alternatively, in at least one example, the fallback determination module 118 can determine that the vehicle control device 114 is not receiving output trajectory(s) and/or other communications from the computer system(s) 102. That is, the fallback determination module 118 can determine that the computer system(s) 102 are nonresponsive and/or noncommunicative. Based at least in part on determining that the computer system(s) 102 are nonresponsive and/or noncommunicative, the fallback determination module 118 can access and/or generate the fallback trajectory responsive to such a determination.

In at least one example, the fallback determination module 118 can provide a fallback trajectory to the execution module 116 and the execution module 116 can compute commands for actuating steering and acceleration of the autonomous vehicle 122 to enable the autonomous vehicle 122 to follow the fallback trajectory.

The data input module 120 can receive input from one or more sensors on the autonomous vehicle 122. In at least one example, the autonomous vehicle 122 can have one or more sensors which can include LIDAR sensors for capturing LIDAR data for segmentation and/or classification, camera sensors for capturing vision data for image segmentation and/or classification, RADAR sensors for capturing range, angle, and/or velocity of objects in an environment, SONAR sensors for capturing acoustic information of objects in an environment, etc. In at least one example, the data input module 120 can receive data from each of the sensors (e.g., LIDAR sensors, camera sensors, Radar sensors, sonar sensors, etc.) described above and can process the data to identify objects and determine information about the objects in the environment. Additionally, the autonomous vehicle 122 can include ultrasonic transducers, wheel encoders, microphones, inertial measurement unit(s) (IMU), accelerometers, gyroscopes, magnetometers, temperature sensors, humidity sensors, light sensors, GPS sensors, etc. The data input module 120 can process data received from the one or more sensors to determine a state of the autonomous vehicle 122 at a particular time. That is, the data input module 120 can process data received from the one or more sensors to determine a position of the autonomous vehicle 122 at a particular time, an orientation of the autonomous vehicle 122 at a particular time, a velocity of the autonomous vehicle 122 at a particular time, etc.

Such data (e.g., real-time processed sensor data) can be used by the fallback determination module 118 to determine when a fallback action is warranted and/or to generate a fallback trajectory. Additionally and/or alternatively, such data (e.g., real-time processed sensor data) can be used by the execution module 116 for computing a steering angle and velocity to enable the autonomous vehicle 122 to follow the output trajectory and/or fallback trajectory.

In at least one example, the execution module 116 and the fallback determination module 118 can have a fourth frequency of operation (e.g., $f_4$) that is different than the route planning module 104, the decision module 106, and/or the trajectory module 108. In at least one example, the execution module 116 and the fallback determination module 118 can operate at a highest frequency to enable the execution module 116 and the fallback determination module 118 to make near real-time decisions.

Additional details of the computer system(s) 102 and/or the vehicle control device 114 are provided below in connection with FIG. 9.

As described above, in at least one example, individual of the modules can have different frequencies of operation. For instance, the route planning module 104 can have a first frequency of operation (e.g., $f_1$), the decision module 106 can have a second frequency of operation (e.g., $f_2$), the trajectory module 108 can have a third frequency of operation (e.g., $f_3$), and the execution module 116 and the fallback determination module 118 can have a fourth frequency of operation (e.g., $f_4$). In at least one example, the first frequency can be the lowest frequency (e.g., 10 Hertz) and the fourth frequency can be the highest frequency (e.g., 100 Hertz), as described above. This configuration enables the architecture 100 to distribute computational resources to modules based on a frequency in which individual modules receive updated data and/or a time period in which individual modules need to process and output data.

Additionally, as described above, the computer system(s) 102 can be separate and distinct from the vehicle control device 114. In some examples, this configuration can enhance safety, redundancy, and optimization. As described above, in at least one example, the fallback determination module 118 can determine the occurrence of an event warranting a fallback action, as described above. In such an example, the fallback determination module 118 can access and/or generate a fallback trajectory, which can be executed by the execution module 116. In at least one example, the fallback instruction can correspond to instructions for aggressively (but safely) stopping the autonomous vehicle 122. In other examples, the fallback instruction can correspond to performing some other safety maneuver.

Furthermore, as described above, the data input module 120 can receive sensor data from one or more sensors. The data input module 120 can process sensor data received from the one or more sensors to determine the state of the autonomous vehicle 122 locally. The execution module 116 can utilize the state of the autonomous vehicle 122 for computing a steering angle and velocity to enable the autonomous vehicle 122 to follow the output trajectory without having to communicate with the computer system(s) 102. That is, separating the vehicle control device 114, which is executing the execution module 116, from the computer system(s) 102, which are executing one or more other modules (e.g., route planning module 104, decision module 106, trajectory module 108, etc.), can conserve computational resources expended by the vehicle control device 114 by enabling the vehicle control device 114 to execute trajectory(s) locally.

In an additional and/or alternative example, the separation of the computer system(s) 102 from the vehicle control device 114 can be useful for troubleshooting. For instance, a programmer can identify an error, flaw, failure, fault, etc. associated with either the computer system(s) 102 or the vehicle control device 114. Accordingly, the programmer can troubleshoot either the computer system(s) 102 or the vehicle control device 114, instead of troubleshooting the entire system.

Furthermore, the separation of the computer system(s) 102 from the vehicle control device 114 can enable easier safety certification of the vehicle control device 114. That is, by separating the planning functionality (on the computer system(s) 102) from the execution functionality (on the vehicle control device 114), the architecture 100 can minimize the amount of code executing on the vehicle control device 114, making safety certification(s) easier to obtain.

Figure 2:
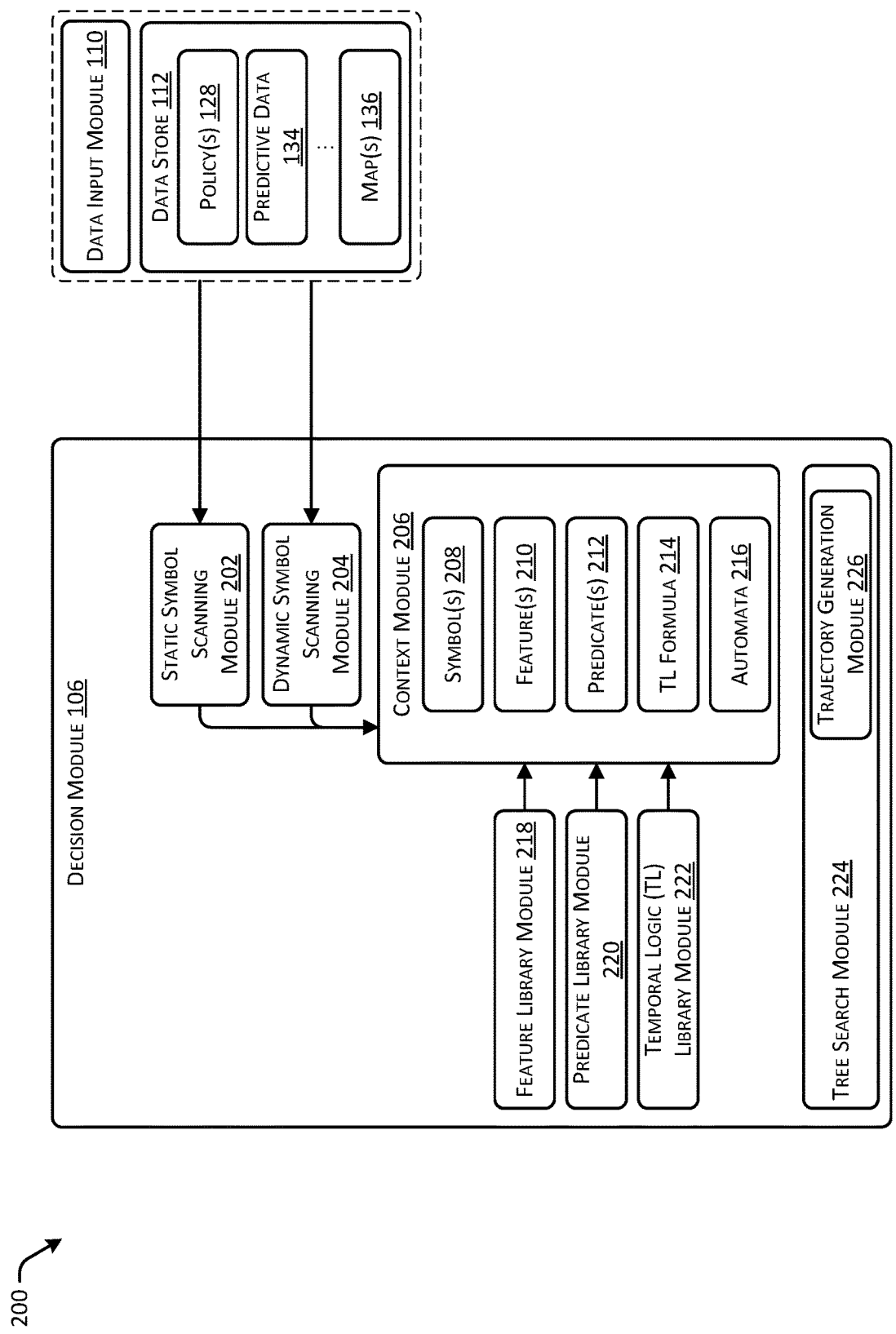
FIG. 2 illustrates a detail of an example architecture for generating trajectories to control an autonomous vehicle, as described herein.

FIG. 2 illustrates a detail of an example architecture 200 for generating trajectories to control an autonomous vehicle, as described herein. The example architecture 200 illustrates aspects of the decision module 106 receiving inputs from the data input module 110 and the data store 112 to generate one or more routes or trajectories to be used in controlling the autonomous vehicle.

In general, the decision module 106 can include a static symbol scanning module 202 and a dynamic symbol scanning module 204 to receive and/or generate information about an environment of the world. For example, the static symbol scanning module 202 can receive map information from the map(s) 136, whereby static objects can be encoded or annotated into the map(s) 136. As can be understood, the static symbol scanning module 202 can scan the map(s) 136 to determine any static symbols within a threshold distance (e.g., a horizon) of the autonomous vehicle. For example, a threshold distance or horizon can be within 100 meters of the autonomous vehicle, although any distance can be used. In some instances, the horizon can be constrained or limited to area in a potential area of travel of the autonomous vehicle (e.g., in the vehicle's path) although it can be appreciated that any horizon can be used. Examples of static symbols include stop regions (e.g., areas proximate to a stop sign), lane regions (e.g., areas corresponding to a lane on a road), intersection regions (e.g., intersections controlled by traffic light(s), intersections controlled by stop/yield signs, uncontrolled intersections, etc.), turn regions (e.g., areas of intersections for turning), post turn regions (e.g., areas of a road following a turn), buildings, obstacles, trees, signs, etc. Examples of dynamic symbols include other vehicles, pedestrians, etc.

The static symbol scanning module 202 can receive information associated with static symbols from the map(s) 136, as discussed above, or from the perception system. For example, the data input module 110 can provide data from any number of sensors, including LIDAR sensors, camera sensors, RADAR sensors, SONAR sensors, etc., and can perform segmentation and/or classification on captured data to identify any static and/or dynamic objects, and can provide information associated with the static and/or dynamic objects (e.g., a bounding box and/or label) to one or both of the static symbol scanning module 202 and the dynamic symbol scanning module 204. In some instances, the dynamic symbol scanning module 204 can receive information associated with dynamic objects from the predictive data 134, such as a predicted behavior of a particular object. In some instances, the predictive data 134 can include one or more possible trajectories associated with dynamic objects, such as potential paths for other vehicles on the road. The predictive data 134 can be based in part on previously observed behavior that is used to predict future behavior of the various dynamic objects.

Further, the dynamic symbol scanning module 204 can receive one or more of the policies 128 associated with one or more dynamic objects. For example, a policy of the policy(s) 128 can include information about capabilities and/or behavior of the dynamic symbols in an environment (e.g., with respect to pedestrians, they can walk across the road at a crosswalk, walk along a sidewalk etc.).

As the static symbol scanning module 202 and the dynamic symbol scanning module 204 receive symbol data corresponding to an environment, the symbol data can be used to build a context of the environment in the context module 206. For example, the symbol data can be stored as one or more symbol(s) 208. As symbols are input to the context module 206, the decision module 106 can include functionality to determine various feature(s) 210, predicate(s) 212, temporal logic (TL) formula 214, and automata 216. As discussed herein, the feature(s) 210 can include statements based on symbols that return a number, such as a determination that an autonomous vehicle is 5 meters away from a stop region.

Further, the predicates 212 can include logical statements based on features and/or symbols that return values (e.g., Boolean values such as True or False, or continuous values indicating a degree of satisfaction of a statement). In one example where a symbol is an autonomous vehicle under control of the current system, a predicate can be evaluated as True or False based on whether the autonomous vehicle is in a stop region or not (e.g., proximate to a stop sign). In some examples, features 210 can be generated for a subset of static and/or dynamic objects present in a horizon. In an example where the autonomous vehicle is driving in traffic including other vehicles, features 210 can be computed for vehicles ahead of and behind the autonomous vehicle in the same lane, as well as in the neighboring lane, and for the nearest vehicles to the left and right on the cross street. As can be understood, limiting a number of features can improve a functioning of the decision module 106 by reducing an amount of data and/or possibilities to consider for planning purposes.

The TL formulas 214 can be evaluated based on the present symbols, features, and/or predicates. As discussed throughout this disclosure, temporal logic (TL) can be used to model or encode formulas about the future of paths or objects, and whether conditions will eventually be true, whether a condition will be true until another fact becomes true, etc. In some instances, the temporal logic may include signal temporal logic (STL), interval temporal logic (ITL), computational tree logic (CTL), property specification language (PSL), Hennessy-Milner logic (HML), etc. In some instances, in addition to or instead of TL, the systems described herein can use planning domain definition language (PDDL) and/or STRIPS (Stanford Research Institute Problem Solver). In some instances, references to a particular implementation of temporal logic is not intended to limit the example to the particular implementation. In some instances, the TL formulas 214 can include statements about the world that reflect proper driving behavior (e.g., rules of the road, right-of-way rules, rules against tailgating, etc.) for an autonomous vehicle, for example. As candidate routes and trajectories are generated for the autonomous vehicles, the routes and trajectories can be evaluated using the TL formulas 214 to determine if the trajectories satisfy the TL formulas 214, in which case, trajectories can be rejected, or evaluated with respect to other costs and constraints to select the highest performing trajectory. In some instances, the temporal logic formulas can be used to automatically generate a state machine that can be used by components of the computer systems 102 and/or the vehicle control device 114 for tasks in addition to generating and/or rejecting candidate trajectories.

In some instances, a TL formula 214 can be evaluated (e.g., by a processor associated with the decision module 106) to determine if a formula is violated or not (e.g., as a Boolean result). By way of another example, a TL formula 214 can be evaluated (e.g., utilizing STL) to provide an indication of an extent to which a condition is satisfied, while determining a cost for violating a condition (e.g., assigning a penalty to a state as a function of how far an autonomous vehicle stops beyond a stop line, rather than or in addition to assigning a Boolean value to the condition). Additional aspects of the TL formula 214 are discussed throughout this disclosure.

As a context of an environment and an autonomous vehicle are determined by the decision module 106 (e.g., including the various symbols, features, predicates, TL formula, etc.), the context can be used to generate the automata 216, which can correspond to a finite state machine that accepts trajectories as inputs to evaluate a cost of the trajectory and/or whether the trajectory violates any TL formula. In some instances, the automata 216 can include Rabin automata.

As can be understood, the context module 206 can include situationally relevant information, and therefore the information populated into the context module 206 can be based on the present symbols 208, and can be selected from one or more predefined libraries.

For example, the decision module 106 can include a feature library module 218, a predicate library module 220, and a temporal logic (TL) library module 222. As various symbols are introduced into the context module 206, the feature library module 218 can determine one or more features that are situationally relevant based on present symbols and/or other features, and can populate the features 210 of the context module 206. Similarly, as various symbols and features are introduced into the context module 206, the predicate library module 220 can determine one or more predicates that are situationally relevant based on present symbols, features, and or other predicates, and can populate the predicates 212 of the context module 206. As various symbols, features, and predicates are introduced into the context module 206, the TL formula library module 222 can determine one or more TL formulas that are situationally relevant based on present symbols, features, and/or predicates, and can populate the TL formula 214 of the context module 206. Additional examples of various symbols, features, predicates, and TL formula are discussed in FIGS. 3, 4, and 5, as well as throughout the disclosure.

As the context module 206 is populated with the various symbols 208, features 210, predicates 212, and TL formula 214, the TL formula 214 can be converted to the automata 216, which can operate as a finite state machine to accept trajectories as inputs for model checking, as discussed herein. Examples of various automata can include, but are not limited to Rabin automata, Streett automata, Büchi automata, Muller automata, etc. In some instances, the automata can accept any number of finite inputs or infinite inputs. In some instances, the automata can include any number of finite states, or can include an infinite number of states. In some instances, the automata can include deterministic, non-deterministic, or alternation automata. In some instances, the automata can include nondeterministic or deterministic finite state machines, deterministic pushdown automata, linear bounded automata, Turing machines, non-deterministic or deterministic Büchi automata, Rabin automata, Streett automata, Parity automata, Muller automata, etc.

Further, the decision module 106 can include a tree search module 224 and a trajectory generation module 226 for generating and testing possible trajectories to control the autonomous vehicle. In some instances, the tree search module 224 can generate a tree including various nodes, where each node of the tree can represent a speculative context corresponding to a different potential trajectory. In some instances, the tree search module 224 may utilize a Monte Carlo Tree Search. As the tree search module 224 and the trajectory generation module 226 build the tree, the modules simultaneously evolve a context of the environment corresponding to different trajectories, and can compare each evolved context (e.g., which can be referred to as a snapshot) against each TL formula or automata to determine whether the trajectory violates a TL formula, and if so, and in some examples, can provide an indication of a cost associated with such a violation. The tree search module 224 can include machine learning that learns and guides the processing to select actions (e.g., trajectories) that are most likely to be correct, based on a current context, to test various trajectories.

In general, and in some examples, the decision module 106 can be modeled under consideration as a Markov Decision Process (MDP). In such an example, learning can be performed over a sequence of time steps (see, e.g., FIG. 6). For example, at step t, the autonomous vehicle (e.g., the decision module 106) can observe a state, $s_t \in S$, which represents the sensed state of the system, which is to say, an internal state as well as what the decision module 106 perceives about an environment it operates in. In some examples, S can be defined to include dynamic and kinematic models of the autonomous vehicle and the environment. Based on s, the autonomous vehicle can select an action $\alpha_t \in A$ from an available set of actions, A. On performing $\alpha_t$ on the autonomous vehicle having a state $s_t$, the autonomous vehicle can receive an immediate reward, $r_t \in R$, and move to a state $s_{t+1}$. Such actions and rewards can be associated with a particular goal of the autonomous vehicle. For example, the goal of the autonomous vehicle can be to maximize its cumulative reward. Additionally, or in the alternative, such a goal can be based, at least in part, on a time-discounted sum of rewards over a time horizon (which can be finite or infinite). In general, a mapping from states to actions for a particular autonomous vehicle can be defined as a policy, $\pi: S \rightarrow A$.

In some instances, the decision module 106 can be modeled as a semi-Markov Decision Process (sMDP), such that the decision module 106 can utilize information for multiple previous time steps. In general, the decision module 106 can utilized a policy over "actions" or "options", which maps from a state space associated with the decision module 106 to a high-level action. Examples include a policy to stay within a lane, a policy to change lanes, etc. This option (or action) can also be represented as a second policy, which maps from states to controls (e.g., steering angle rate, acceleration, etc.). As discussed herein, a tree search algorithm (e.g., MCTS) can select actions to be performed from particular states and executes such as selected actions for some length of time. When the policy is executed, the planner repeatedly calls the action policy to get an acceleration and steering angle rate pair, then receives input regarding the environment to determine what effect the acceleration and/or steering angle rate inputs had, and then evaluates again.

Additionally, or in the alternative, a Q-function (a feature of a Markov Decision Process (MDP)) can be used to provide additional insight into the model. The value of $Q^\pi(s,a)$ is defined to be the best cumulative reward that can be obtained in the future under policy $\pi$ after performing action $\alpha$, given a current state, s. The Q-function is thus a local measure of the quality of action $\alpha$. Similarly, the "value function" of an MDP $V^\pi:S \rightarrow R$ is a local measure of the quality of s under policy $\pi$. In some examples, for an optimal policy $\pi^*$, $V^*$ and $Q^*$ can be obtained as fixed points using Bellman's equation. In some examples, either the V function or the Q function can be approximated.

In some examples, a policy can be learned iteratively. In a non-limiting example, an actor-critic policy iteration method can be used. In such an example, during each iteration, i, the "critic" estimates $Q^{\pi_i}$, and the "actor" uses this to improve $\pi_i$ to determine $\pi_{i+1}$.

In some examples, the MDP can be solved by picking from a hypothesis class of policies $\pi$ composed using a set of high-level options, which are themselves learned from a hypothesis class of parametrized control policies using a deep neural network. In such an example, the optimal policy cannot be contained in this hypothesis class, but a good approximation can be obtained.

Additional details of the TL library module 222, and temporal logic in general, are discussed below. In one or more examples, properties of plans can be defined in terms of a set of atomic statements (also referred to as atomic propositions, or predicates). An atomic proposition is a statement about the world that is either True or False. In such an example, a finite set of atomic propositions, AP, can be used to indicate properties such as occupancy of a spatial region. Additionally, or in the alternative, a labeling function $\mathcal{L}: S \rightarrow 2^{AP}$ map be provided as a map from system states to subsets of atomic propositions that are True (e.g., with the rest being False).

In any example as stated above, a run of an MDP s= $s_0 s_1 s_2 \ldots$ can be defined as an infinite sequence of state pairs, where $s_i \in S$ is the agent state at time step i, and there is some action $\alpha \in A$ that, when applied from $s_i$, can result in $s_{i+1}$. Furthermore, a word can be defined as an infinite sequence of labels $\mathcal{L}(s) = \mathcal{L}(s_0) \mathcal{L}(s_1) \mathcal{L}(s_2) \ldots$, for some run s. Using such a notation, a suffix of s starting at index, i, can be defined as $s_i = s_{i+1} s_{i+2} \ldots$, with corresponding word $\mathcal{L}(s_i)$.

LTL can be used to concisely and precisely specify permitted and prohibited system behaviors in terms of the corresponding words. Formulas in LTL are constructed from $p \in AP$ according to a grammar:

$$\varphi ::= p | \neg \varphi | \varphi \vee \varphi | X\varphi | \varphi \, \mathcal{U} \, \varphi \quad (8)$$

where $\neg$ is negation, $\vee$ is disjunction, X is "next", and $\mathcal{U}$ is "until." Boolean constants True and False are defined as usual: True=$p \wedge \neg p$ and False=$\neg$True. Conjunction ($\wedge$), implication ($\Rightarrow$), equivalence ($\Leftrightarrow$), "eventually" (F$\varphi$=True $\mathcal{U} \, \varphi$) and "always" (G$\varphi$=$\neg$F$\neg \varphi$) are derived.

The semantics of LTL can be defined inductively over a word $\mathcal{L}(s)$ as follows:

$$\begin{bmatrix} \mathcal{L}(s_i) \models & p \text{ if and only if } p \in \mathcal{L}(s_i) \\ \mathcal{L}(s_i) \models & \neg \varphi \text{ if and only if } \mathcal{L}(s_i) \not\models \varphi \\ \mathcal{L}(s_i) \models & \varphi_1 \vee \varphi_2 \text{ if and only if } \mathcal{L}(s_i) \models \varphi_1 \\ & \text{and } \mathcal{L}(s_i) \models \varphi_2 \\ \mathcal{L}(s_i) \models & X\varphi \text{ if and only if } \mathcal{L}(s_{i+1}) \models \varphi \\ \mathcal{L}(s_i) \models & \varphi_1 \mathcal{U} \varphi_2 \text{ if and only if } \exists j \geq i \text{ such that} \\ & \mathcal{L}(s_j) \models \varphi_2 \text{ and } \forall i \leq k \leq j, \mathcal{L}(s_k) \models \varphi_1 \end{bmatrix} \quad (9)$$

A word $\mathcal{L}(s)$ satisfies $\varphi$, denoted by $\mathcal{L}(s) \models \varphi$, if $\mathcal{L}(sx_0) \models \varphi$. A run s satisfies $\varphi$ if $\mathcal{L}(s) \models \varphi$.

In such a system, X$\varphi$ expresses that $\varphi$ is true in a subsequent "step" or position in the run's state sequence (e.g., ne$\underline{X}$t), $\varphi_1 \, \mathcal{U} \, \varphi_2$ expresses that $\varphi_1$ is true until $\varphi_2$ becomes true (e.g., $\underline{U}$ntil), G$\varphi$ means that $\varphi$ is true in every position (e.g., $\underline{G}$lobally true), F$\varphi$ means $\varphi$ is true at some position (e.g., $\underline{F}$inally), GF$\varphi$ means $\varphi$ is true infinitely often (it reoccurs indefinitely), and aRb expresses that b holds indefinitely until a becomes true (e.g., $\underline{R}$elease). Importantly, in some examples, changes in atomic propositions can be described over time.

In general, it is possible to define two primary types of properties allowed in a specification: safety properties, which guarantee that "something bad never happens", and liveness conditions, which state that "something good (eventually) happens." Such types correspond naturally to LTL formulas with operators "always" (G) and "eventually" (F), as discussed above.

Turning to the automata 216 discussed above, in some examples, such logical expressions (e.g., the TL formula 214) can be formulated as deterministic Rabin automata (DRA). A deterministic Rabin automaton is a tuple $\mathcal{A} = (Q, \Sigma, \delta, q_0, \mathcal{F})$ comprising: a finite set of states Q, a finite alphabet $\Sigma$, a transition function $\delta: Q \rightarrow Q$, an initial state $q_0 \in Q$, and a set of accepting pairs $\Omega = \{(L_1, U_1) \ldots, (L_N, U_N)\}$. Such automata have an equivalence with LTL formulas. As described briefly below, any LTL formula can be translated into one of the automata 216.

As a non-limiting example, let $\Sigma^\omega$ be the set of infinite words over $\Sigma$. A run of $\mathcal{A}$ can be defined as an infinite sequence $q_0 q_1 q_2 \ldots$ of states in $\mathcal{A}$ such that there exists a word $\sigma = \sigma_0 \sigma_1 \sigma_2 \ldots \in \Sigma^\omega$ with $(q_i, \sigma_i) = q_{i+1}$ for $i \geq 0$. Run $q_0 q_1 q_2 \ldots$ can be defined to be accepted by $\mathcal{A}$ if there is a pair $(L_j, U_j) \in \Omega$ such that $q_i \in L_j$ for infinitely many indices $i \in \mathbb{N}$ and $q_i \in U_j$ for at most finitely many i.

As such, it is possible to denote by $\mathcal{L}(\mathcal{A})$ the set of words that are accepted by $\mathcal{A}$. Any LTL formula $\varphi$ over variables in AP can, therefore, be automatically translated into a corresponding DRA $\mathcal{A}_\varphi$ of size automaton $2^{2^{|AP|}}$ such that $\sigma \in \mathcal{L}(\mathcal{A}_\varphi) \Leftrightarrow \sigma \models \varphi$.

Using either an LTL formulation, or DRA, such statements or formula can correspond, for example, to the output of sensors and processors onboard an autonomous vehicle. For example, various LIDAR, RADAR, cameras, ultrasonic transducers, and the like can return sensor data. Such sensor data can be subject to various algorithms, such as blob detectors, object detectors, object classifiers, to determine the presence (or absence of) objects in an environment, as well as object properties (e.g., size, shape, orientation, position, velocities, etc.). Similar sensor modalities can be employed to localize such an autonomous vehicle in a 3D map by the use of, for example, Kalman filters, particle filters, bundle adjustment, SLAM (simultaneous localization and mapping) algorithms in general, or the like. As a particular example, an LTL formula can be evaluated as true once an autonomous vehicle has determined that it has approached an intersection, detected another vehicle at the intersection, and waited until there was no longer another vehicle in the intersection.

Turning to the tree search module 224 discussed above, in some examples, searching for a policy can be performed using a sampling-based algorithm, such as a Monte Carlo Tree Search (MCTS). A MCTS can be considered to be a general heuristic search algorithm that forms the basis of a large family of game-playing algorithms. Such an algorithm can be performed on discrete sets of data, as well as in continuous domains by incorporating various modifications. In various examples, an Upper Confidence Bound (UCB) for Trees version of the MCTS can be used.

In such an example, the tree is recursively descended, starting with $s=s_0$ as the current state. During descent, at each branch the UCB metric can be used to choose an action. The UCB metric can be defined as:

$$\left[ a^* = \operatorname{argmax}_a Q(s,a) + c\sqrt{\frac{\log(n_a)}{n_s + 1}} \right] \quad (10)$$

In those instances where an unexplored node is reached, a rollout to simulate a value of the node can be performed until a horizon or a terminal state for the current problem is reached.

In some examples, system evolution can be determined as a function of both continuous and discrete dynamics. For example, evolution of a continuous state and a discrete state can be defined as: $[x'=f_c(x, w, u, o), w'=f_d(x, w, u, o)]$, where $x \in X \subseteq \mathbb{R}^{n_c}$ is the continuous state, (11)

$u \in \mathcal{U} \subseteq \mathbb{R}^{m_c}$ is the continuous control input, (12)

$w \in \mathcal{W}$ is the discrete (logical) world state, and (13)

$o \in \mathcal{O}$ is a discrete (logical) option from a finite set $\mathcal{O}$. (14)

As such, atomic propositions $p \in AP$ can be defined as functions over the discrete world state, for example, as $p: \mathcal{W} \to \{True, False\}$.

In the MDP framework, $S = X \times \mathcal{W}$, $A = \mathcal{U} \times \mathcal{O}$, $\delta(xw, uo) = x'w'$ such that $x' = f_c(x,w,u,o), w' = f_d(x,w,u,o)$. In such a framework, the labeling function over states can be represented as:

$\mathcal{L}(xw) = \{p \in AP \text{ such that } p(w) = True\}$ (15)

In some examples, such a system can be decomposed into actors. For example, each independent entity can be an actor. Additionally, or in the alternative, the agent under control (e.g., the autonomous vehicle) can be considered to be an actor. In those examples comprising multiple actors, a world state $s = xw \in X \times \mathcal{W}$ can comprise an environment, $e \in \varepsilon$ and some number of actors, N. Using such a definition, the i-th world state in a sequence can be fully defined as: $[x_i w_i = \langle x_{0,i} w_{0,i}, x_{1,i} w_{1,i}, \ldots, x_{N,i} w_{N,i}, e \rangle]$, where each actor k's state $x_{k,i} \in \mathbb{R}^{n_{k,c}}$ and $w_{k,i} \in \mathcal{W}_k$ such that $\Sigma_k n_{k,c} = n_c$ and $\Pi \mathcal{W}_k = \mathcal{W}$. In such an example, actor 0 can be designated a planner for the autonomous system.

Using this decomposition, it is possible to use a feature function $\phi: S \to \mathcal{F}$, which computes a low-dimensional representation of the world state containing all information needed to compute a policy. As a non-limiting example, the problem can be decomposed into finding two sets of policies: a policy $\pi_O: \mathcal{F} \to \mathcal{O}$ over high-level actions and a policy $\pi_\mathcal{U}: \mathcal{O} \times \mathcal{F} \to \mathcal{U}$ over low-level controls, such that their composition solves the MDP. In such an example, a first subgoal can be to compute a policy $\pi_\mathcal{U}^*(., o)$ for each high-level option, o, that maps from arbitrary feature values to controls:

$$[\pi_\mathcal{U}^*(\phi(xw),o) = \operatorname{argmax}_u(V^*(\delta(xw,uo)))] \quad (16)$$

Additionally, or in the alternative, a second policy over options, m can be computed:

$$[\pi_O^*(\phi(xw)) = \operatorname{argmax}_o \pi_L(\phi(xw),o)] \quad (17)$$

Because of additional structure imposed on the final policy (which takes the form $\pi^*(s) = \pi_\mathcal{U}^*(\phi(s), \pi_O^*(s))$), the optimal policy found will be that based on the set of options $\mathcal{O}$ (e.g., which can not necessarily be the true optimal policy).

As briefly indicated above (and with respect to any of FIGS. 1-9), creating a control algorithm for an autonomous vehicle can be accomplished by a mixture of discrete and continuous spaces. By incorporating logical statements with a sampling based algorithm, low-level policies and high-level policies can be decomposed and combined to provide insight into actions to perform. In some examples, learned policies can be used together with an approach based on Monte Carlo Tree Search (MCTS). Such learned policies can be based on various machine learning algorithms. Machine learning generally refers to a broad class of such algorithms in which an output is generated based on learned parameters, which will be discussed in detail below. In some examples, as briefly mentioned above, one machine learning algorithm which can be used is a deep neural network.

In some examples, learning models are simple multilayer perceptrons with 32 hidden neurons, though more or less can be used. Additionally, or in the alternative, models may be trained using Keras and TensorFlow. In some examples, the Keras-RL implementations of deep reinforcement learning algorithms DQN (Deep Q-Networks), DDPG (Deep Deterministic Policy Gradients), and continuous DQN can be used.

In those examples which employ an Upper Bound Confidence, the Upper Confidence Bound (UCB) weight term can be set as follows:

$$\left[ Q(w_i, o_i) + C \frac{P(w_i, o_i)}{1 + N(w_i, o_i)} \right] \quad (18)$$

where C is an experimentally-determined, domain-specific constant.

In those examples which use this term, exploration is encouraged while focusing on option choices that performed well according to previous experience. As such, a high weight can be granted to any terms that have a high prior probability from the learned model.

Additionally, or in the alternative, a Progressive Widening can be used to determine when to add a new node to the MCTS. In some examples, a version of MCTS with Progressive Widening that searches over learned options can be used. In some examples, Progressive Widening can be implemented as $n_{children}^* = \sqrt{(n_w)}$. In some instances, the third, fourth, fifth-roots, etc., can be used for Progressive Widening, and is not necessarily limited to the user of the square root.

In some instances, the MCTS can utilize any machine learning algorithms or neural networks. In addition to or in the alternative to the example discussed herein, one example of a neural network can include a convolutional neural network, or CNN. Each layer in a CNN can also comprise another CNN, or can comprise any number of layers. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

In some examples, it can be possible to check the model, which is to say, it can be possible to evaluate a correctness of various trajectories using the TL formula 214 discussed above. As a non-limiting example, each discrete option can be associated with an LTL formula $\varphi_o$ which establishes preconditions for applying that option. In those examples, a query can be performed $u_i = \pi \mathcal{U}(o, \phi(x_i, w_i))$ to get the next control as long as $\varphi_o$ holds. Additionally, or in the alternative, a shared set $\Phi$ of LTL formulas can be selected that constrain the entire planning problem.

In some examples, in order to evaluate the cost function when learning options, as well as during MCTS, it is possible to check whether sampled runs satisfy an LTL formula (e.g., the TL formula 214). For example, given an infinite run s, one method to determining if $\mathcal{L}(s) \vDash \varphi$ is to check whether $\mathcal{L}(s)$ is in the language of the Deterministic Rabin Automaton (DRA) that recognizes $\varphi$. In such an example, checking that an infinite run s satisfies $\varphi$ is equivalent to checking if $\mathcal{L}(s) \in \mathcal{L}(\mathcal{A}_\varphi)$. However, when checking finite runs, all possible infinite suffixes must be evaluated when defining the bounded-time semantics.

In some examples, a finite run prefix, $s_{pre} = s_0 s_1 \ldots s_i$, can be determined to satisfy $\varphi$, denoted $s_{pre} \vDash_i \varphi$, if for all possible suffixes $s_{suff} = s_{i+1} s_{i+2} \ldots s_{pre} s_{suff} \vDash \varphi$. Conversely, $s_{pre} = s_0 s_1 \ldots s_i$ violates $\varphi$, denoted $s_{pre} \nvDash_i \varphi$, if for all possible suffixes $s_{suff} = s_{i+1} s_{i+2} \ldots, s_{pre} s_{suff} \nvDash \varphi$. If there are suffixes that satisfy as well as violate $\varphi$, then it is not possible to make a determination about $s_{pre}$'s satisfaction of $\varphi$.

In some examples, model checking is performed using the above bounded semantics. In those models, the state of the DRA $\mathcal{A}_\varphi$ (e.g., the automata 216) can be partitioned into accepting (A), rejecting (R), and neutral states (N). Further, each state can be labeled, q, based on an existence of Rabin suffixes that begin in q and satisfy an acceptance condition. Such a pre-computation can be done using Tarjan's algorithm for strongly connected components (SCCs). In those examples which use such an algorithm, all A and R states are contained in Bottom SCCs, e.g., SCCs that are sinks. In those examples which use an annotated DRA, checking that a finite prefix $s_{pre} \vDash_i \varphi$ can be done in O(i) time.

Figure 3:
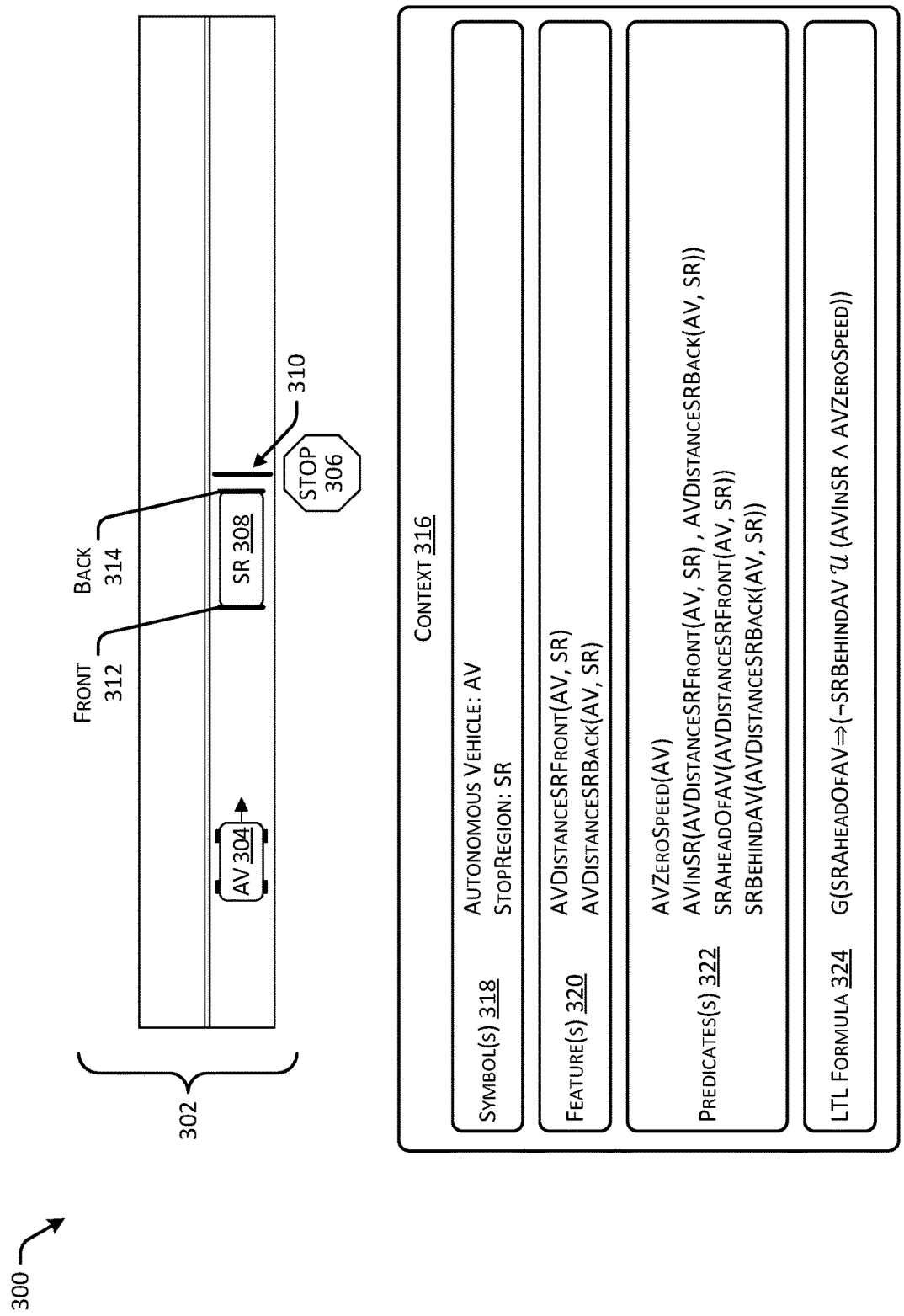
FIG. 3 depicts a top level view of a scenario including an autonomous vehicle navigating a stop sign.

FIG. 3 depicts an example scenario 300 including an autonomous vehicle navigating a stop sign. In this scenario 300, an environment 302 includes an autonomous vehicle 304 driving on a road toward a stop sign 306. In one example, to complete this task, the autonomous vehicle 304 must approach the stop sign 306, stop in a stop region 308 before a stop line 310, wait, and accelerate away from the stop sign 306 to continue towards another goal. As can be understood, the scenario 300 can be a portion of a larger task or trajectory (e.g., to travel from one location to another location). As illustrated, the stop region 308 can be associated with a front 312 and a back 314, which can be explained in connection with a context 316.

As discussed above, the stop region 308 can be a static symbol determined by the static symbol scanning module 202 of the decision module 106. In some instances, other objects such as the front 312 and the back 314 of the stop region 308, the stop line 310, and the stop sign 306 can be static symbols as well. In some instances, the static symbols can be encoded into a map (e.g., the map(s) 136), and in some instances, the static symbols can be determined by a perception system using image segmentation and/or classification. As the static symbols are encountered within a horizon of the autonomous vehicle 304, the static symbols can be instantiated in the context 316, which can store a state of the world represented in the environment 302. In some instances, the autonomous vehicle 304 can be considered as a static or dynamic symbol.

Thus, the context 316 can include symbols(s) 318, including but not limited to, the autonomous vehicle: AV and the StopRegion: SR. Of course, the context 316 can include any number of the symbols 318 depending on a complexity of the environment 302 in which the autonomous vehicle 304 is operating. Further, the context 316 can depend on a horizon associated with the decision module 106. Of course, as a size of the horizon increases (e.g., to 50 meters, 100 meters, 200 meters, etc.), a number of symbols 318 within the horizon can increase, thereby increasing a complexity of the decision-making process. In some instances, a size of the horizon can depend on a velocity of the autonomous vehicle 304 (e.g., as velocity increases a size of the horizon increases). In some instances, a size of a horizon can increase until a threshold number of symbols are detected (e.g., expanding the horizon until 10 symbols are determined).

As the symbols 318 are added to the context 316, the operations can include automatically populating the context 316 with corresponding features 320, predicates 322, and LTL formula 324. As can be understood, the various features 320, predicates 322, and the LTL formula 324 can be selected from the corresponding libraries 218, 220, and 222 of FIG. 2, respectively.

Turning to the features 320, the features 320 can include, but are not limited to features including AVDistanceSRFront (AV, SR), and AVDistanceSRBack(AV, SR). By way of example, the feature AVDistanceSRFront(AV, SR) depends of a state of the autonomous vehicle (AV) 304 and the stop region (SR) 308, and returns a numerical value indicating a distance between the front of the stop region (312) and the autonomous vehicle 304. Similarly, the feature AVDistanceSRBack(AV, SR) depends of a state of the autonomous vehicle (AV) 304 and the stop region (SR) 308, and returns a numerical value indicating a distance between the back of the stop region (314) and the autonomous vehicle 304. In some examples, a front portion of the autonomous vehicle 304 can be used when determining distances of the example features 320 discussed above, although any point associated with the autonomous vehicle 304 can be used as well.

As the features 320 are instantiated into the context 316, the predicates 322 can be automatically added to the context 322 as well based on the presence of the symbols 318 and the features 320. In the scenario 300, exemplary predicates can include, but are not limited to: AVZeroSpeed(AV), which evaluates as True or False depending on whether the autonomous vehicle 304 is stopped or not; AVInSR(AVDistanceSRFront(AV, SR), AVDistanceSRBack(AV, SR)), which evaluates as True or False depending on whether the autonomous vehicle (AV) 304 is in the stop region (SR) 308, and can be based on the features discussed above (e.g., AVDistanceSRFront(AV, SR) and AVDistanceSRBack(AV, SR)); SRAheadOfAV(AVDistanceSRFront(AV, SR)), which evaluates as True or False depending on whether the stop region (SR) 308 is ahead of the autonomous vehicle (AV) 304, and depends on the feature AVDistanceSRFront(AV, SR); and SRBehindAV(AVDistanceSRBack(AV, SR)), which evaluates as True or False depending on whether the stop region (SR) 308 is behind the autonomous vehicle (AV) 304, and can depend on the feature AVDistanceSRBack(AV, SR).

As the predicates 322 are instantiated into the context 316, the LTL formula 324 can be automatically added to the context 316 based on the presence of the symbols 318, the features 320, and the predicates 322. For example, in this scenario 300, the applicable LTL formula 324 can include:

$$G(\text{SRAheadOfAV} \Rightarrow (\neg \text{SRBehindAV}\ \mathcal{U}\ (\text{AVInSR} \wedge \text{AVZeroSpeed}))) \quad (19)$$

The equation above can correspond to a statement read as: "Globally (at any point in a trajectory), if the autonomous vehicle (e.g., 304) sees a stop region (e.g., 308) ahead of the autonomous vehicle (e.g., 304), then it should not be the case that stop region (e.g., 308) is behind the autonomous vehicle (e.g., 304) until the autonomous vehicle (e.g., 304) has stopped in the stop region (e.g., 308)." For example, a trajectory that did not stop in the stop region 308 would violate this LTL formula 324 because the stop region 308 would be behind the autonomous vehicle 304 without the autonomous vehicle 304 stopping in the stop region 308.

In some instances, the LTL formula 324 can be used to generate one or more automaton, which can be used in model checking or verifying that various trajectories comply with the LTL formula 324. For example, the context 316 can be incorporated into a Monte Carlo Search Tree (MCTS) and a state of the context 316 can be evolved forward as various snapshots to create various candidate trajectories. Further, candidate trajectories can be evaluated against various LTL formula to determine if the trajectories violate the formulas. If a trajectory violates a formula, trajectory can be discarded as part of the search. For example, the statement "car in intersection implies intersection is clear and (the car was not in the intersection until the car had a higher priority than other vehicles)" is an LTL constraint that corresponds to a condition of a vehicle waiting for its turn at a four way stop.

Accordingly, various trajectories can be generated and checked against the LTL formula 324 and/or against one or more automaton corresponding to the LTL formula 324 to verify a correctness of individual trajectories. In some instances, if different trajectories do not violate the LTL formula 324 (e.g., more than one trajectory satisfies the LTL formula 324), a trajectory can be selected based on costs (e.g., speed, comfort, performance, etc.). For example, costs can be determined and associated with specific actions associated with a trajectory. In one example, a first trajectory may satisfy the LTL formula associated with a task and may have a low cost relative to a second trajectory that also satisfies the LTL formula but has a higher cost to complete the trajectory. The decision module 106 may select the first trajectory to guide the autonomous vehicle 304, as the lower cost of the first trajectory may represent a faster travel, more comfortable ride (e.g., comfortable accelerations and decelerations), or may represent reduced wear and tear on the autonomous vehicle 304, for example.

Figure 4:
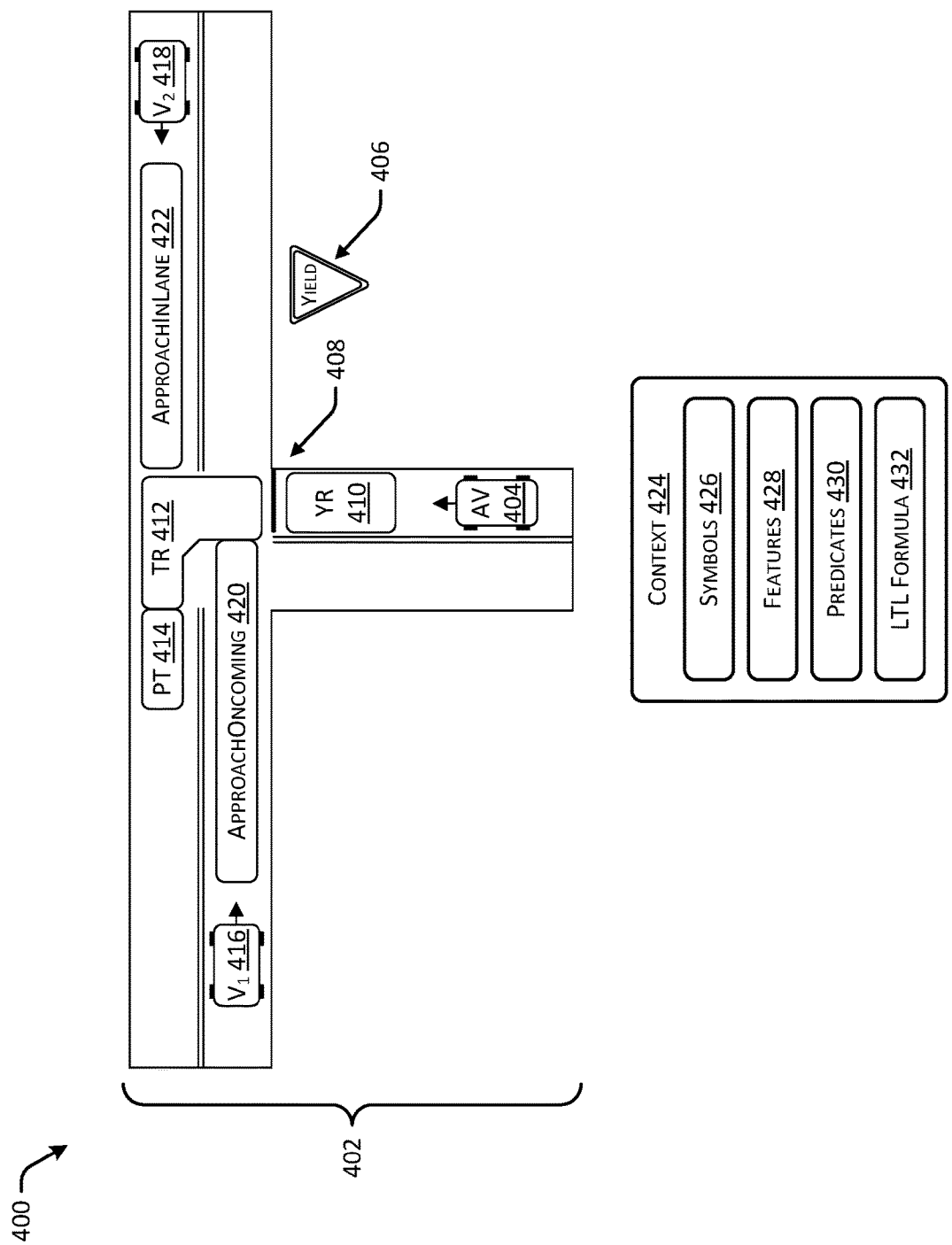
FIG. 4 depicts a top level view of a scenario including an autonomous vehicle navigating a three-way intersection with multiple vehicles.

FIG. 4 depicts an example scenario 400 including an autonomous vehicle navigating a three-way intersection. In this scenario 400, an environment 402 includes an autonomous vehicle 404 driving on a road towards an intersection which is partially controlled by a yield sign 406. In this scenario, a high-level goal for the autonomous vehicle 404 is to approach the intersection and turn left. The yield sign 406 can have an associated yield line 408 and a yield region 410, and the intersection can include a turn region 412 and a post turn region 414. As discussed above, the static features in the environment 402 can be determined as a static symbol from a map, or determined via a perception system of the autonomous vehicle 404.

The environment 402 also includes vehicles 416 and 418, which can be determined by a perception system or prediction system of the autonomous vehicle 404. Further, the first vehicle, $V_1$ 416, can have an associated approach region ApproachOncoming 420, which can correspond to a region of the road in which the vehicle 416 can be predicted to traverse. The second vehicle, $V_2$ 418, can have an associated approach region ApproachInLane 422, which can correspond to a region in a lane in which the autonomous vehicle 404 can turn to accomplish a goal (e.g., turn left at the intersection). In some instances, the regions ApproachOncoming 420 and ApproachInLane 422 can include a velocity component that are based on a velocity of vehicles 416 and 418, respectively, which corresponds to a minimum stopping distance to stop to avoid a collision in the turn region 412. For example, the first vehicle $V_1$ 416 can be traveling a first speed, such that the ApproachOncoming 420 region represents a minimum stopping distance for the vehicle 416 to stop if the autonomous vehicle 404 enters the turn region 412 and is positioned in a region where a collision with the vehicle V₁ 416 would be possible. In other words, if the vehicle 416 is in the ApproachOncoming 420 region, the vehicle 416 cannot stop in the ApproachOncoming 420 region (e.g., without traversing through the entire ApproachOncoming 420 region) based on a velocity of the vehicle 416.

Based on the symbols present in the environment 402, a context 424 can be populated including the various symbols 426, features 428, predicates 430, and LTL formula 432 that are situationally relevant.

By way of example, and without limitation, the symbols 426 for the environment 402 can include: the turning region (TR 412); the post turn region (PT 414); the yield region (YR 410); the ApproachOncoming 420 region; the ApproachInLane 422 region; the first vehicle ($V_1$ 416); the second vehicle ($V_2$ 418); and the autonomous vehicle (AV 404).

By way of example, the features 428 can include various operations related to a front and back of each of the regions 410, 412, 414, 420, and 422. These features 428 can be similar to the features discussed above in connection with FIG. 3, although the details are omitted for simplicity.

The predicates 430 can be included in the context 424 based on the symbols 426 discussed above. By way of example, and without limitation, the predicates 430 can include: In(AV, YR), which evaluates as True or False depending on whether the autonomous vehicle 404 is in the yield region 410; In(AV, TR), which evaluates as True or False depending on whether the autonomous vehicle 404 is in the turn region 412; In(AV, PT), which evaluates as True or False depending on whether the autonomous vehicle 404 is in the post turn region 414; In($V_i$, ApproachOncoming), which evaluates as True or False depending on whether a vehicle (e.g., $V_1$ 416 or $V_2$ 418) is in the ApproachOncoming 420 region; In($V_i$, ApproachInLane), which evaluates as True or False depending on whether a vehicle (e.g., $V_1$ 416 or $V_2$ 418) is in the ApproachInLane 422 region; In($V_i$, TR), which evaluates as True or False depending on whether a vehicle (e.g., $V_1$ 416 or $V_2$ 418) is in the turn region 412; Cutoff($V_i$, TR), which evaluates as True or False depending on whether a vehicle (e.g., $V_1$ 416 or $V_2$ 418) would need to slam on their brakes to avoid collision if there is an object in the turn region 412; Clear(TR), which evaluates as True or False based on the predicates In($V_i$, TR), In($V_i$, ApproachOncoming), In($V_i$, ApproachInLane), and Cutoff($V_i$, TR); Stopped(AV), which evaluates as True or False based on whether the autonomous vehicle 404 is stopped; and Collision(AV, $V_i$), which evaluates as True or False based on whether the autonomous vehicle 404 has collided with one of the vehicles $V_1$ 416 or $V_2$ 418.

Similarly, the LTL formulas 432 can be added to the context 424 as the symbols 426, the features 428, and the predicates 430 are instantiated. By way of example, and without limitation, exemplary LTL formulas 432 include:

$$\neg \text{Clear } \mathcal{U} (\wedge_i \neg In(V_i,TR)$$

$$\wedge_i \neg In(V_i, \text{ApproachOncoming})$$

$$\wedge_i \neg In(V_i, \text{ApproachInLane})) \tag{20}$$

The equation (20) can be understood by the following statement: "It is not clear (e.g., for the autonomous vehicle 404 to make a turn) until no vehicles (e.g., $V_1$ 416 and $V_2$ 418) are in the turn region 412 and approach regions 420 and 422."

$$G(In(AV,YR) \Rightarrow (In(AV,YR) \mathcal{U} \text{ Clear}(TR))) \tag{21}$$

The equation (21) can be understood by the following statement: "Stay in the yield region 410 until the turn region 412 is clear."

$$G(In(AV,TR) \Rightarrow \neg \text{Stopped}(AV)) \tag{22}$$

The equation (22) can be understood by the following statement: "No stopping in the turn region 412."

$$G(In(AV,TR)) \Rightarrow F(In(AV,PT)) \tag{23}$$

The equation (23) can be understood by the following statement: "The autonomous vehicle 404 being in the turn region 410 implies eventually making it to the post turn region 414."

$$\neg F(\text{Collision}(H,V_i)) \tag{24}$$

The equation (24) can be understood by the following statement: "The autonomous vehicle 404 should never collide with vehicles (e.g., $V_1$ 416 and $V_2$ 418)."

Of course, the scenario 400 is one exemplary embodiment, and an environment can include any number of static symbols and/or dynamic symbols, and accordingly, a context can have any variety of situationally relevant symbols, context, features, predicates, and LTL formula, as discussed herein.

Figure 5:
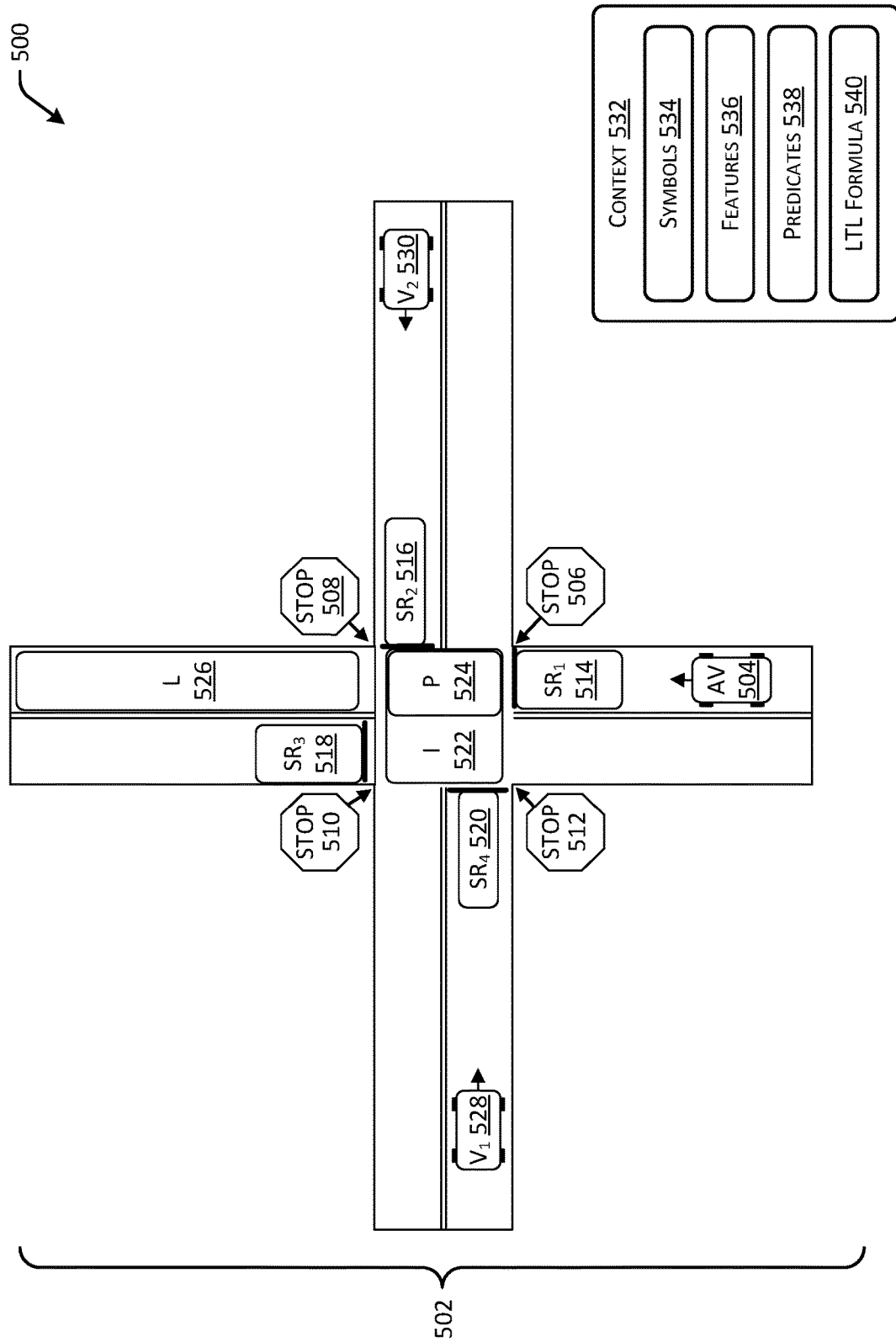
FIG. 5 depicts a top level view of a scenario including an autonomous vehicle navigating a four-way intersection with multiple vehicles.

FIG. 5 depicts an example scenario including an autonomous vehicle navigating a four-way intersection. In this scenario 500, an environment 502 includes an autonomous vehicle 504 driving on a road towards a four-way intersection controlled by stop signs 506, 508, 510, and 512. In this scenario, a high-level goal for the autonomous vehicle 504 is to approach the intersection, stop, wait for right of way, and travel through the intersection. Each of the stop signs 506, 508, 510, and 512 can have an associated stop line (illustrated in FIG. 5) and associated stop regions 514, 516, 518, and 520, and the intersection can include an intersection region 522, and an intersection path region 524. A lane goal region 526 can correspond to the goal of the autonomous vehicle 504 following traversal of the intersection. The environment 502 can include vehicles $V_1$ 528 and $V_2$ 530. As discussed above, the static features in the environment 502 can be determined as a static symbol from a map, or determined via a perception system of the autonomous vehicle 504, while the dynamic symbols can be determined via the perception system.

As indicated in FIG. 5 by the arrows associated with the vehicles $V_1$ 528 and $V_2$ 530 (and as indicated throughout the disclosure), the vehicles $V_1$ 528 and $V_2$ 530 can be traveling towards the stop signs 512 and 508, respectively. In some instances, a prediction system of the autonomous vehicle 504 can be monitoring the motion of the vehicles $V_1$ 528 and $V_2$ 530 to determine or anticipate when the vehicles $V_1$ 528 and $V_2$ 530 will arrive at the stop regions 520 and 516, respectively, and can base the planning of the autonomous vehicle 504 at least in part on the predicted trajectories of the vehicles $V_1$ 528 and $V_2$ 530.

Based on the symbols present in the environment 502, a context 532 can be populated including the various symbols 534, features 536, predicates 538, and LTL formula 540 that are situationally relevant.

By way of example, and without limitation, the symbols 534 for the environment 502 can include: the intersection region (I 522); the lane goal region (L 526); the intersection path region (P 524); the stop regions ($SR_1$ 514, $SR_2$ 516, $SR_3$ 518, and $SR_4$ 520); the autonomous vehicle (AV 504), and the vehicles ($V_1$ 528 and $V_2$ 530).

By way of example, the features 536 can include various operations related to a front and back of each of the regions 514, 516, 518, 520, 522, and 524. These features 536 can be similar to the features discussed above in connection with FIG. 3, although the details are omitted for simplicity.

The predicates 538 can be included in the context 532 based on the symbols 534 discussed above. By way of example, and without limitation, the predicates 538 can include: In(AV, I), which evaluates as True or False depending on whether the autonomous vehicle 504 is in the intersection region 522; In(AV, L), In(AV, P), In(AV, $SR_i$), In($V_i$, I), In($V_i$, $SR_i$), which individually evaluate as True or False depending on whether the subject vehicle (e.g., AV 504, $V_1$ 528, $V_2$ 530) is in the subject region (e.g., L 526, P 524, $SR_1$ 514, $SR_2$ 516, $SR_3$ 518, $SR_4$ 520, and I 522); AVTurn(AV, $V_i$, $SR_i$), which can be represented as a logical formula that evaluates as True or False depending on whether the various vehicles are in various regions, and based on a history to determine if it is time for the autonomous vehicle 504 to go (e.g., based on whether the autonomous vehicle 504 has the right of way); Clear(I), which can be represented as a logical formula based on In($V_i$, I) to determine if the intersection region 522 is clear; Stopped (AV); and HasStopped(AV, $SR_1$), which evaluates as True or False depending on whether the autonomous vehicle 504 previously came to a stop in the stop region $SR_1$ 514.

Similarly, the LTL formulas 540 can be added to the context 532 as the symbols 534, the features 536, and the predicates 538 are instantiated. By way of example, and without limitation, exemplary LTL formulas 540 include:

$$G(In(AV,SR_1)) \Rightarrow (In(AV,SR_1)$$

$$\mathcal{U} (HasStopped(AV,SR_1) \wedge Clear(I) \wedge AVTurn(AV,V_i,SR_1)))) \quad (25)$$

The equation (25) can be understood by the following statement: "The autonomous vehicle 504 is to stay in the stop region 514 until the autonomous vehicle 504 has come to a stop in the stop region 514, the intersection 522 is clear, and it is the turn of the autonomous vehicle 514."

$$G(In(AV,P)) \Rightarrow \neg Stopped(AV) \quad (26)$$

The equation (26) can be understood by the following statement: "No stopping in the intersection path region 524."

$$FIn(AV,L) \quad (27)$$

The equation (27) can be understood by the following statement: "The autonomous vehicle will eventually reach the goal lane region 526."

Figure 6:
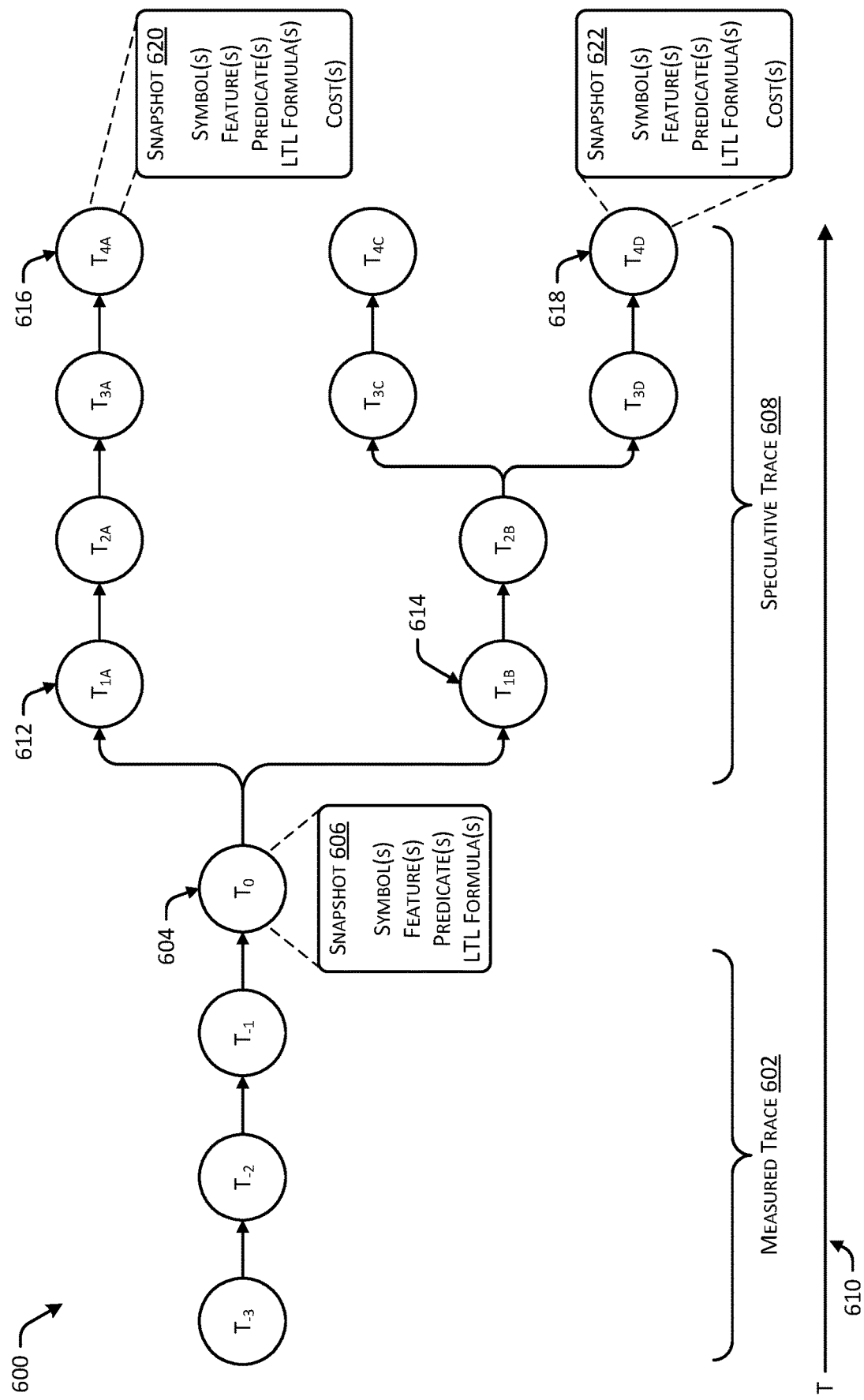
FIG. 6 illustrates a search tree for evaluating candidate trajectories, as described herein.

FIG. 6 illustrates a search tree 600 for evaluating candidate trajectories, as described herein. In some instances, the search tree 600 can be associated with a measured trace 602, which can store observations about the environment over time, such as the presence of symbols in an environment, states of an autonomous vehicle (e.g., velocity, steering angle, acceleration, etc.). Further, the search tree 600 can be associated with a current state 604, which can include a snapshot 606. In some examples, the snapshot 606 can represent a state of an environment at a particular instant in time, and can include, but is not limited to, various symbol(s), feature(s), predicate(s), LTL formula(s), etc. In some instances, current state 604 can be considered to be a part of the measured trace 602.

Based at least in part on the snapshot 606 reflecting the current state 604 at $T_0$ (e.g., an initial time), the search tree 600 can evolve the snapshot 606 over time, represented as a speculative trace 608, which can reflect speculations about the environment as various trajectories are considered for selection for the autonomous vehicle. In some examples, the speculative trace 608 can include predictions about other vehicles (e.g., not controlled by the decision module 106) in the environment with the autonomous vehicle.

As illustrated, the search tree 600 can represent different states at different times and/or based on different potential actions. Further, it can be understood that the search tree 600 can represent speculation in the future as the passage of time moves from left to right in FIG. 6, as represented by a timeline 610. Nodes have been labeled by time step and to distinguish between different speculative traces. For example, nodes 612 and 614 represent speculative traces at time $T_1$, a time after $T_0$, but represent two different speculations, "A" and "B." Thus, the node 612 can be referred to as $T_{1A}$, while the node 614 can be represented as $T_{1B}$. In some instances, Progressive Widening can be used to determine when to add a new node, which may limit a maximum number of children of a given node based at least in part on a number of times a world state has been considered or visited by the search algorithm. In some instances, each action modeled in the search tree 600 has one or more associated termination conditions. When the search tree 600 reaches a termination condition associated with an action (e.g., completion of a lane change, traversing a section of road, passage of a period of time, movement above a threshold distance, threshold velocity, threshold acceleration, etc.), the search tree 600 may branch and choose a new action to follow. In some instances, a termination condition can be a logical combination of at least two termination conditions. The search can continue until a termination condition is reached for a trajectory or route as they related to a goal, such as a destination.

Just as the node 604 represents the snapshot 606 at an initial time, subsequent nodes can each include a snapshot representing a state of an environment based on a potential trajectory and potential changes in the world over time. For example, a node 616 can include a snapshot 620, while a node 618 can include a snapshot 622. As can be understood, the snapshot 620 can be based on intervening updates and conditions represented in the nodes $T_{1A}$, $T_{2A}$, and $T_{3A}$, while the snapshot 622 can be based on intervening updates and conditions represented in the nodes $T_{1B}$, $T_{2B}$, and $T_{3D}$.

Turning to the current state 604, various permutations of possible trajectories can be modeled and stored as an instance of MCTS to be searched and compared against the LTL formulas and/or evaluated to determine costs associated with various actions. For example, as the MCTS is built, a snapshot (e.g., representing the context or automata) can evolve the context based on changing conditions (e.g., over time, as objects move, etc.), and the snapshot can be checked for compliance with the various LTL formulas. If multiple trajectories are determined not to violate an LTL formula, a trajectory with a lowest cost (or a highest performance, comfort, etc.) can be selected. For example, for various operations of the autonomous vehicle, or for various possible trajectories, a cost function can penalize acceleration, jerk, lateral acceleration, yaw, steering angle, steering angle rate, etc.

In some instances, machine learning can be used to more accurately determine possible trajectories to investigate using the MCTS based on a current state and/or learned trajectories in response to the current state(s) and/or tasks to be completed. For example, based on a current state of an environment, the MCTS with machine learning can determine candidate trajectories that are most likely to result in satisfactory outcomes based on learned low-level policies (e.g., how to travel in a road lane, how to change lanes, how to stop, how not to tailgate, etc.) and learned high-level policies (e.g., previously selected actions with good outcomes).

Figure 7:
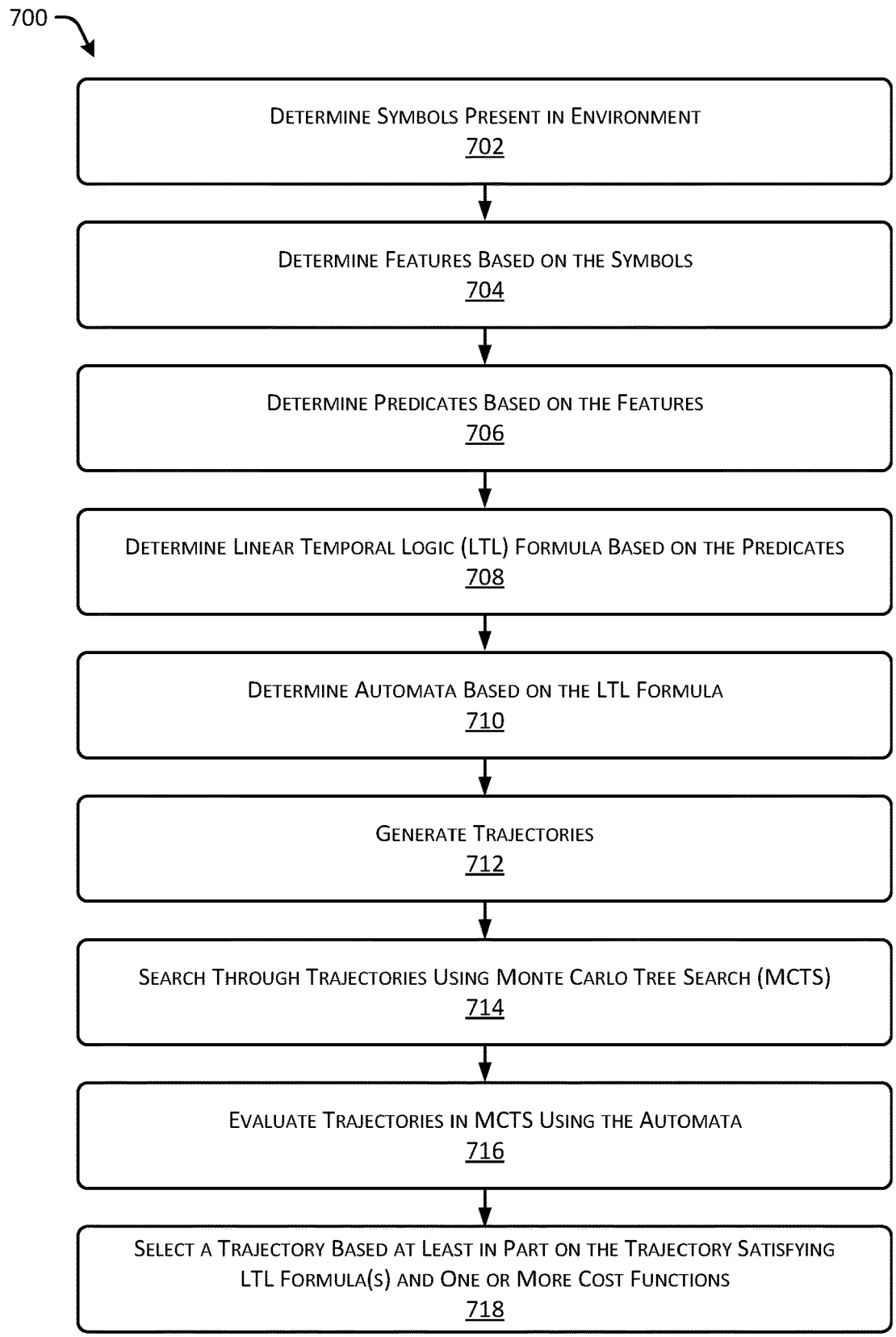
FIG. 7 depicts an example process for generating a trajectory for an autonomous vehicle, as described herein.
Figure 8:
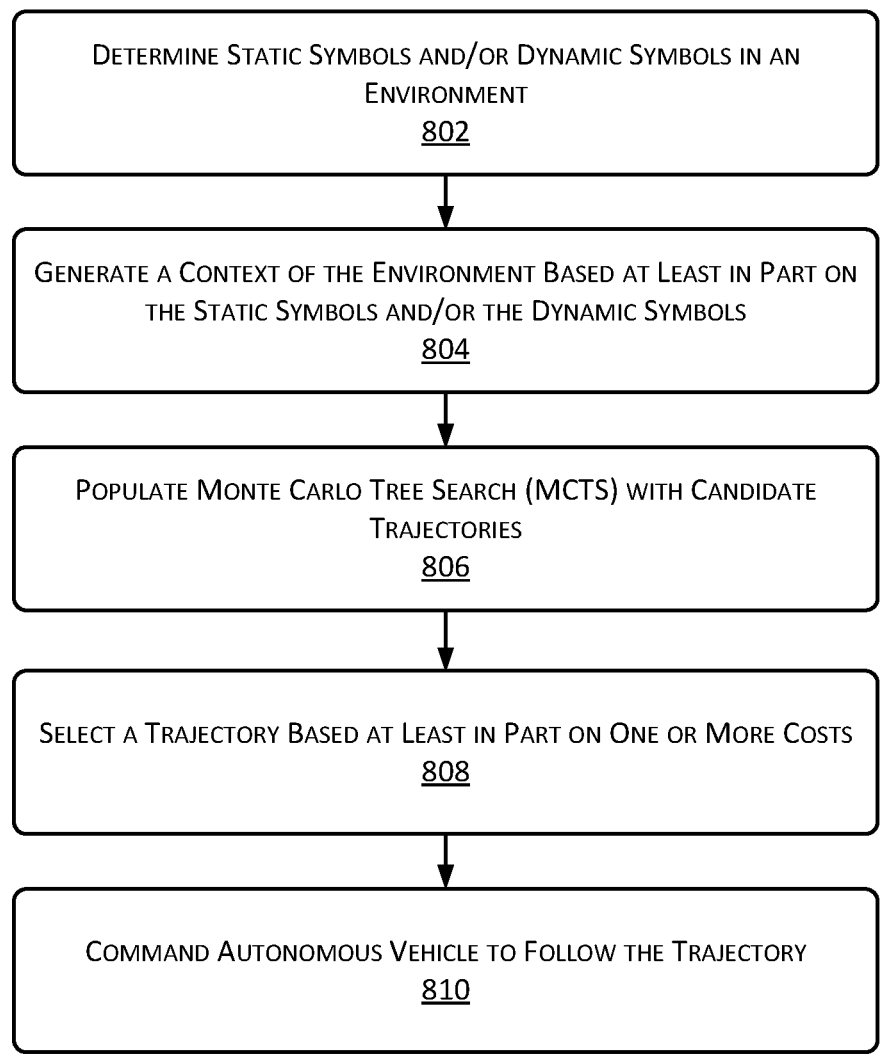
FIG. 8 depicts another example process for generating a trajectory for an autonomous vehicle, as described herein.

FIGS. 7 and 8 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 7 depicts an example process 700 for generating a trajectory for an autonomous vehicle, as described herein. For example, some or all of the process 700 can be performed by one or more components in the architectures 100 or 200, or in the environment 900, as described herein.

At operation 702, the process can include determining one or more symbols present in an environment. In some examples, the symbols can include any number or combination of static symbols and dynamic symbols. In some examples, the symbols can be determined by checking map data that stores information associated with static symbols. In some instances, the operation 702 can include determining a location of the autonomous vehicle on a map, determining symbols that are within a horizon (e.g., a threshold distance) of the autonomous vehicle, and populating a context with the symbols. In some instances, the operation 702 can include determining static or dynamic symbols via a perception system that can receive sensor data (e.g., LIDAR data, RADAR data, acoustic data, camera data, etc.), perform segmentation on the sensor data, and perform classification on the data to identify the static and/or dynamic objects. In some instances, the operation 702 can include receiving prediction data about the dynamic symbols, such as a probable trajectory of the dynamic object(s).

At operation 704, the process can include determining features based on the symbols determined in the operation 702. As discussed herein, features can return a numerical value that can be based on symbols or other features. For example, if symbols such as an autonomous vehicle and another vehicle are added to the context, a feature can determine a distance between the autonomous vehicle and the other vehicle. Further, a feature can include determining an identifier of a stop region (e.g., stop region #123, where any identifier can be used). As can be understood, a variety of features can be used based on the symbols present in an environment.

At operation 706, the process can include determining one or more predicates based on the features. As discussed herein, in some instances, predicates can include logical formulas based on symbols, features, or other predicates that evaluate as True or False based on input values. In one example, a predicate can be evaluated to determine whether or not an autonomous vehicle has stopped in a stop region. In another example, a predicate can provide an indication of how well the predicate is satisfied by the conditions. For example, for a predicate that determines whether an autonomous vehicle stops in a stop region, in a scenario where the autonomous vehicle stops 1 cm beyond the stop region, the Boolean evaluation of the predicate would be False, although a predicate that returns an indication of the degree of satisfaction can indicate a location where the autonomous vehicle stopped or a degree of the predicate violation, and/or can associate a penalty with that action. In some instances, a penalty for stopping 1 cm outside a stop region can be a minor penalty, but a penalty for stopping 1 meter beyond the stop region can be a major penalty.

At operation 708, the process can include determining one or more linear temporal logic (LTL) formulas based at least in part on the predicates. Such formulas may be a subset of LTL formulas stored in a data store which are relevant. In some instances, the selected LTL formulas can be directly or indirectly based on one or more symbols, features, predicates, or other LTL formula present in the context. Examples of the LTL formulas are provided above in connection with FIGS. 3, 4, and 5, as well as throughout the disclosure.

At operation 710, the process can include determining automata based on the LTL formula. In some examples, the automata can correspond to a Deterministic Rabin Automata. In some instances, the operation 710 can include converting the LTL formula to a corresponding automata, which can accept as inputs states of the world and can be evaluated to determine if a potential trajectory violates the LTL determined herein. Examples of various automata can include, but are not limited to Rabin automata, Streett automata, Büchi automata, Muller automata, etc. In some instances, the automata can accept any number of finite inputs or infinite inputs. In some instances, the automata can include any number of finite states, or can include an infinite number of states. In some instances, the automata can include deterministic, non-deterministic, or alternation automata. In some instances, the automata can include nondeterministic or deterministic finite state machines, deterministic pushdown automata, linear bounded automata, Turing machines, non-deterministic or deterministic Büchi automata, Rabin automata, Streett automata, Parity automata, Muller automata, etc.

At operation 712, the process can include generating one or more trajectories. At operation 714, the operation can include searching through the trajectories using Monte Carlo Tree Search (MCTS). In some instances, trajectories can be determined as the Monte Carlo Tree Search is built. In some instances, the trajectories can be generated and provided to the MCTS. In some instances, the trajectories can represent any possible trajectories based on drivable surfaces and symbols. In some instances, the trajectories can be based at least in part on a goal for an autonomous vehicle, which can include traveling from a high-level origination location to a high-level destination location. In some instances, trajectories for an autonomous vehicle can depend on predicted trajectories for other vehicles, rules of the road, physical constraints (e.g., acceleration, steering angles, breaking, etc.), etc. Further, in some instances, for each trajectory generated to further the autonomous vehicle towards a goal, the operations 712 and/or 714 can include generating a fallback trajectory that can stop the vehicle or otherwise alter a trajectory of the autonomous vehicle in events such as emergencies (e.g., imminent collision).

At operation 716, the process can include evaluating the trajectories in the MCTS using the automata. For example, the automata determined in the operation 710 can evaluate each trajectory at individual time steps over time. If a trajectory violates the LTL corresponding to the automata, the operation 716 can provide a Boolean indication of the status, and/or can provide a value corresponding to the degree of satisfying or violating the LTL formula.

At operation 718, the process can include selecting a trajectory based at least in part on the trajectory satisfying one or more LTL formulas and one or more cost functions. For example, if multiple trajectories satisfy (e.g., do not violate) the LTL formula, the operation 718 can select a trajectory based on a cost or performance associated with the trajectory. In some instances, costs can be based at least in part on efficiency, comfort, performance, etc. of the autonomous vehicle. Thus, the process 700 can output a trajectory that has a highest performance and lowest cost to accomplish a goal associated with an autonomous vehicle.

FIG. 8 depicts another example process for generating a trajectory for an autonomous vehicle, as described herein. For example, some or all of the process 800 can be performed by one or more components in the architectures 100 or 200, or in the environment 900, as described herein.

At operation 802, the process can include determining one or more static symbols and/or dynamic symbols in an environment. In some instances, the operation 802 can be based at least in part on a horizon associated with an autonomous vehicle. That is, the operation 802 can include determining static symbols and dynamic symbols within a horizon, or threshold distance, from the autonomous vehicle. As discussed herein, in some instances, the static symbols can be determined from stored map data, and in some instances, static symbols and dynamic symbols can be determined via a perception system or a prediction system associated with the autonomous vehicle.

At operation 804, the process can include generating a context of the environment based at least in part on the static symbols and/or the dynamic symbols. For example, the context can include a state of the environment at a particular instant in time. In some instances, the context can include symbols, features, predicates, and/or LTL formula, automata, snapshots, costs, constraints, etc., as discussed herein.

At operation 806, the process can include populating a Monte Carlo Tree Search (MCTS) with candidate trajectories. For example, the operation 806 can include receiving the context generated in the operation 804 above, and establishing an initial state of the MCTS with the current context. The operations can include evolving the context forward in time based on a progression of behaviors of objects represented in the context. For example, evolving the context can include changing positions of dynamic objects based on current or expected velocities. In some instances, the operation 806 can include selecting between available actions to generate branches of the MCTS, whereby the different branches can represent differing trajectories. In some instances, the operation 806 can utilize a trained neural network to determine which actions to pursue, based at least in part on the current or initial context.

At operation 808, the process can include selecting a trajectory based at least in part on one or more costs. In some instances, the operation can include verifying that any candidate trajectory does not violate an LTL formula. Further, in some instances, a violation of an LTL formula many not result in discarding the candidate trajectory, but can be considered as a penalty, and can be considered when choosing a trajectory. In some instances, costs can depend on comfort aspects (acceleration, braking levels, etc.), and in some instances, the cost can be depend on safety aspects, in which case, a cost can be higher or lower depending on the importance of the factor under consideration.

At operation 810, the process can include commanding an autonomous vehicle to follow the trajectory. The operation 810 can include generating a sequence of commands to command the autonomous vehicle to drive along the trajectory selected in the operation 808. In some instances, the commands generated in the operation 810 can be relayed to a controller onboard the autonomous vehicle, such as the trajectory module 108, the execution module 116, etc., to control the autonomous vehicle to traverse the trajectory. Although discussed in the context of an autonomous vehicle, the process 800, and the techniques and systems described herein, can be applied to a variety systems utilizing machine vision.

Figure 9:
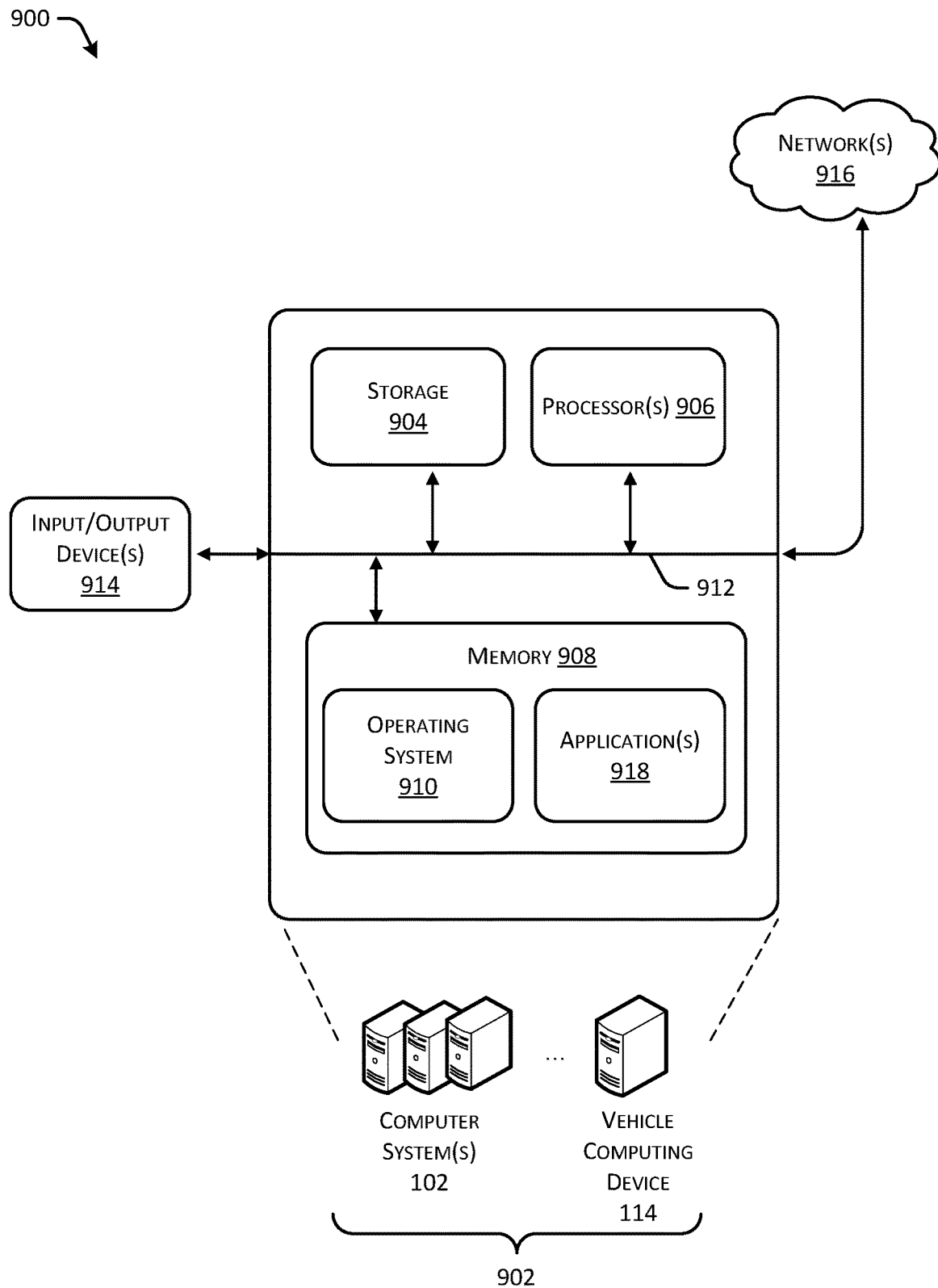
FIG. 9 depicts a block diagram of an example computer system for implementing the techniques described herein.

FIG. 9 illustrates an environment 900 in which the disclosures can be implemented in whole or in part. The environment 900 depicts one or more computer systems 902 that comprise a storage 904, one or more processor(s) 906, a memory 908, and an operating system 910. The storage 904, the processor(s) 906, the memory 908, and the operating system 910 can be communicatively coupled over a communication infrastructure 912. Optionally, the computer system(s) 902 can interact with a user, or environment, via input/output (I/O) device(s) 914, as well as one or more other computer system(s) over a network 916, via the communication infrastructure 912. The operating system 910 can interact with other components to control one or more applications 918.

In some instances, the computer system(s) 902 can correspond to the computer system(s) 102 and/or the vehicle computing device 114 described above with reference to FIG. 1. Further, the computer system(s) 902 can implement any hardware and/or software to implement the modules 104, 106, 108, and 110 to perform route and trajectory planning, as discussed herein.

The systems and methods described herein can be implemented in software or hardware or any combination thereof. The systems and methods described herein can be implemented using one or more computer system(s) which can or can not be physically or logically separate from each other. The methods can be performed by components arranged as either on-premise hardware, on-premise virtual systems, or hosted-private instances. Additionally, various aspects of the methods described herein can be combined or merged into other functions.

With reference to the computer system(s) illustrated in FIG. 9, a processor or computer system can be configured to particularly perform some or all of the methods described herein. In some embodiments, the methods can be partially or fully automated by one or more computers or processors. The systems and methods described herein can be implemented using a combination of any of hardware, firmware and/or software. The present systems and methods described herein (or any part(s) or function(s) thereof) can be implemented using hardware, software, firmware, or a combination thereof and can be implemented in one or more computer systems or other processing systems. In some embodiments, the illustrated system elements could be combined into a single hardware device or separated into multiple hardware devices. If multiple hardware devices are used, the hardware devices could be physically located proximate to or remotely from each other. The embodiments of the methods described and illustrated are intended to be illustrative and not to be limiting. For example, some or all of the steps of the methods can be combined, rearranged, and/or omitted in different embodiments.

In one example embodiment, the systems and methods described herein can be directed toward one or more computer systems capable of carrying out the functionality described herein. Example computer system(s)s can be, but are not limited to, a personal computer (PC) system running any operating system such as, but not limited to, OS X™, iOS™, Linux™, Android™, and Microsoft™ Windows™ However, the systems and methods described herein can not be limited to these platforms. Instead, the systems and methods described herein can be implemented on any appropriate computer system running any appropriate operating system. Other components of the systems and methods described herein, such as, but not limited to, a computer system(s), a communications device, mobile phone, a smartphone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., can also be implemented using a computer system(s). Services can be provided on demand using, e.g., but not limited to, an interactive television (iTV), a video on demand system (VOD), and via a digital video recorder (DVR), or other on demand viewing system.

The computer system(s) can include one or more processors. The processor(s) can be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computer system(s) can include a display interface that can forward graphics, text, and other data from the communication infrastructure for display on a display unit.

The computer system(s) can also include, but is not limited to, a main memory, random access memory (RAM), and a secondary memory, etc. The secondary memory can include, for example, a hard disk drive and/or a removable storage drive, such as a compact disc drive CD-ROM, etc. The removable storage drive can read from and/or written to a removable storage unit. As can be appreciated, the removable storage unit can include a computer usable storage medium having stored therein computer software and/or data. In some embodiments, a machine-accessible medium can refer to any storage device used for storing data accessible by a computer. Examples of a machine-accessible medium can include, e.g., but not limited to: a magnetic hard disk; a floppy disk; an optical disk, like a compact disc read-only memory (CD-ROM) or a digital versatile disc (DVD); a magnetic tape; and/or a memory chip, etc.

The processor can also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM discs. The processor and the memory can be supplemented by, or incorporated in, ASICs (application-specific integrated circuits).

The computer system(s) can be in communication with a computerized data storage system. The data storage system can include a non-relational or relational data store, such as a MySQL™ or other relational database. Other physical and logical database types could be used. The data store can be a database server, such as Microsoft SQL Server™, Oracle™, IBM DB2™, SQLITE™, or any other database software, relational or otherwise. The data store can store the information identifying syntactical tags and any information required to operate on syntactical tags. In some embodiments, the processing system can use object-oriented programming and can store data in objects. In these embodiments, the processing system can use an object-relational mapper (ORM) to store the data objects in a relational database. The systems and methods described herein can be implemented using any number of physical data models. In one example embodiment, a relational database management system (RDBMS) can be used. In those embodiments, tables in the RDBMS can include columns that represent coordinates. In the case of economic systems, data representing companies, products, etc. can be stored in tables in the RDBMS. The tables can have pre-defined relationships between them. The tables can also have adjuncts associated with the coordinates.

In alternative example embodiments, secondary memory can include other similar devices for allowing computer programs or other instructions to be loaded into computer system. Such devices can include, for example, a removable storage unit and an interface. Examples of such can include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket), and other removable storage units and interfaces, which can allow software and data to be transferred from the removable storage unit to computer system.

The computer system(s) can also include an input device such as, but not limited to, a voice input device, such as a microphone, touch screens, gesture recognition devices, such as cameras, other natural user interfaces, a mouse or other pointing device such as a digitizer, and a keyboard or other data entry device. The computer system(s) can also include output devices, such as but not limited to, a display, and a display interface. The computer system(s) can include input/output (I/O) devices such as but not limited to a communications interface, cable and communications path, etc. These devices can include, but are not limited to, a network interface card, and modems. Communications interface(s) can allow software and data to be transferred between a computer system and one or more external devices.

In one or more embodiments, the computer system(s) can be operatively coupled to an automotive system. Such automotive system can be either manually operated, semi-autonomous, or fully autonomous. In such an embodiment, input and output devices can include one or more image capture devices, controllers, microcontrollers, and/or other processors to control automotive functions such as, but not limited to, acceleration, braking, and steering. Further, communication infrastructure in such embodiments can also include a Controller Area Network (CAN) bus.

In one or more embodiments, the computer system(s) can be operatively coupled to any machine vision based system. For example, such machine based vision systems include but are not limited to manually operated, semi-autonomous, or fully autonomous industrial or agricultural robots, household robot, inspection system, security system, etc. That is, the embodiments described herein are not limited to one particular context and can be applicable to any application utilizing machine vision.

In one or more embodiments, the present embodiments can be practiced in the environment of a computer network or networks. The network can include a private network, or a public network (for example the Internet, as described below), or a combination of both. The network can include hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An example computer and/or telecommunications network environment in accordance with the present embodiments can include nodes, which can include hardware, software, or a combination of hardware and software. The nodes can be interconnected via a communications network. Each node can include one or more processes, executable by processors incorporated into the nodes. A single process can be run by multiple processors, or multiple processes can be run by a single processor, for example. Additionally, each of the nodes can provide an interface point between network and the outside world, and can incorporate a collection of sub-networks.

In an example embodiment, the processes can communicate with one another through interprocess communication pathways supporting communication through any communications protocol. The pathways can function in sequence or in parallel, continuously or intermittently. The pathways can use any of the communications standards, protocols or technologies, described herein with respect to a communications network, in addition to standard parallel instruction sets used by many computers.

The nodes can include any entities capable of performing processing functions. Examples of such nodes that can be used with the embodiments include computers (such as personal computers, workstations, servers, or mainframes), handheld wireless devices and wireline devices (such as personal digital assistants (PDAs), modem cell phones with processing capability, wireless email devices including BlackBerry™ devices), document processing devices (such as scanners, printers, facsimile machines, or multifunction document machines), or complex entities (such as local-area networks or wide area networks) to which are connected a collection of processors, as described. For example, in the context of the present disclosure, a node itself can be a wide-area network (WAN), a local-area network (LAN), a private network (such as a Virtual Private Network (VPN)), or collection of networks.

Communications between the nodes can be made possible by a communications network. A node can be connected either continuously or intermittently with communications network. As an example, in the context of the present disclosure, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of example wireless protocols and technologies used by a communications network can include Bluetooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An example non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Embodiments of the present disclosure can include apparatuses for performing the operations herein. An apparatus can be specially constructed for the desired purposes, or it can comprise general purpose computer system(s) selectively activated or reconfigured by a program stored in the computer system(s).

In one or more embodiments, the present embodiments are embodied in machine-executable instructions. The instructions can be used to cause a processing device, for example a general-purpose or special-purpose processor, which is programmed with the instructions, to perform the steps of the present disclosure. Alternatively, the steps of the present disclosure can be performed by specific hardware components that contain hardwired logic for performing the steps, or by any combination of programmed computer components and custom hardware components. For example, the present disclosure can be provided as a computer program product, as outlined above. In this environment, the embodiments can include a machine-readable medium having instructions stored on it. The instructions can be used to program any processor or processors (or other electronic devices) to perform a process or method according to the present example embodiments. In addition, the present disclosure can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals can be stored on the computer systems for subsequent execution.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements.

Input/output (I/O) devices (including but not limited to keyboards, displays, pointing devices, etc.) can be coupled to the system. Network adapters can also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as CUDA, OpenCL, Flash™, JAVA™, C++, C, C #, Python, Visual Basic™, JavaScript™ PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP can be used in implementing interfaces between programming modules. The components and functionality described herein can be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™, etc. The system could be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor can receive and store instructions and data from a computerized data storage device such as a read-only memory, a random access memory, both, or any combination of the data storage devices described herein. A processor can include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in computer system(s) that includes a back-end component, such as a data server, or that includes a middleware component, such as an application server or an Internet server, or that includes a front-end component, such as a client computer having a graphical user interface or an Internet browser, or any combination of them. The components of the computer system(s) can be connected by any form or medium of digital data communication such as a communication network. Examples of communication networks include, e.g., a LAN, a WAN, and the computers and networks that form the Internet.

One or more embodiments of the present disclosure can be practiced with other computer system configurations, including hand-held devices, microprocessor systems, microprocessor-based or programmable consumer electronics, minicomputers, mainframe computers, etc. The systems and methods described herein can also be practiced in distributed computing environments where tasks are performed by remote processing devices that are linked through a network.

The terms "computer program medium" and "computer readable medium" can be used to generally refer to media such as but not limited to removable storage drive, a hard disk installed in hard disk drive. These computer program products can provide software to computer system. The systems and methods described herein can be directed to such computer program products.

References to "one embodiment," "an embodiment," "example embodiment," "various embodiments," etc., can indicate that the embodiment(s) of the present disclosure can include a particular feature, structure, or characteristic, but not every embodiment necessarily includes the particular feature, structure, or characteristic. Further, repeated use of the phrase "in one embodiment," or "in an example embodiment," do not necessarily refer to the same embodiment, although they can. Similarly, references to "instances" can indicate that various instance(s) of the present disclosure can include a particular feature, structure, or characteristic, but not every instance necessarily includes the particular feature, structure, or characteristic. Further, repeated use of the phrase "in some instances" does not necessarily refer to the same instance, although it can.

In the description and claims, the terms "coupled" and "connected," along with their derivatives, can be used. It should be understood that these terms can be not intended as synonyms for each other. Rather, in particular embodiments, "connected" can be used to indicate that two or more elements are in direct physical or electrical contact with each other. "Coupled" can mean that two or more elements are in direct physical or electrical contact. However, "coupled" can also mean that two or more elements are not in direct contact with each other, but yet still co-operate or interact with each other.

An algorithm can be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it can be appreciated that throughout the specification terms such as "processing," "computing," "calculating," "determining," or the like, refer to the action and/or processes of a computer or computer system, or similar electronic computer system(s), that manipulate and/or transform data represented as physical, such as electronic, quantities within the computer system's registers and/or memories into other data similarly represented as physical quantities within the computer system's memories, registers or other such information storage, transmission or display devices.

In a similar manner, the term "processor" can refer to any device or portion of a device that processes electronic data from registers and/or memory to transform that electronic data into other electronic data that can be stored in registers and/or memory. As non-limiting examples, "processor" can be a Central Processing Unit (CPU) or a Graphics Processing Unit (GPU). A "computing platform" can comprise one or more processors. As used herein, "software" processes can include, for example, software and/or hardware entities that perform work over time, such as tasks, threads, and intelligent agents. Also, each process can refer to multiple processes, for carrying out instructions in sequence or in parallel, continuously or intermittently. The terms "system" and "method" are used herein interchangeably insofar as the system can embody one or more methods and the methods can be considered as a system.

While one or more embodiments have been described, various alterations, additions, permutations and equivalents thereof are included within the scope of the disclosure.

In the description of embodiments, reference is made to the accompanying drawings that form a part hereof, which show by way of illustration specific embodiments of the claimed subject matter. It is to be understood that other embodiments can be used and that changes or alterations, such as structural changes, can be made. Such embodiments, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Although the discussion above sets forth example implementations of the described techniques, other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

Example Clauses

A. A system for implementing a control algorithm for an autonomous vehicle, the system comprising: one or more processors; and one or more computer readable storage media communicatively coupled to the one or more processors and storing instructions that are executable by the one or more processors to: receive one or more symbols, the one or more symbols including at least one static symbol or at least one dynamic symbol; determine, based at least in part on the one or more symbols, one or more features; determine, based at least in part on the one or more symbols or the one or more features, one or more predicates; determine, based at least in part on the one or more symbols, one or more features, or one or more predicates, one or more linear temporal logic (LTL) formulas; determine, based at least in part on the one or more LTL formulas, one or more automaton; utilize a Monte Carlo Tree Search (MCTS) to generate one or more candidate trajectories; evaluate the one or more candidate trajectories using the one or more automaton, wherein the one or more automaton verifies that the one or more candidate trajectories satisfies the one or more LTL formulas associated with the one or more automaton; determine, based at least in part on a cost function, a cost associated with a trajectory of the one or more candidate trajectories; select, as a selected trajectory, the trajectory of the one or more trajectories based at least in part on the cost; and control the autonomous vehicle based at least in part on the selected trajectory.

B. A system as paragraph A recites, the instructions further executable by the one or more processors to receive the one or more symbols from at least one of map data representing at least a portion of an environment or from a perception system of the autonomous vehicle that determines the one or more symbols using sensor data captured by the autonomous vehicle.

C. A system as paragraph A or B recites, the instructions further executable by the one or more processors to evaluate the one or more features based at least in part on the one or more symbols to return a numerical value associated with the one or more symbols.

D. A system as any one of paragraphs A-C recite, the instructions further executable by the one or more processors to evaluate the one or more predicates based at least in part on at least one of the one or more symbols or the one or more features to return at least one of a Boolean value or a confidence level associated with a state of the one or more symbols or the one or more features.

E. A system as any one of paragraphs A-D recite, the instructions further executable by the one or more processors to add at least one node to the MCTS based at least in part on a machine learning algorithm comprising a neural network.

F. A system as any one of paragraphs A-E recite, wherein a first node of the MCTS includes a snapshot of an environment including the one or more symbols, the one or more features, the one or more predicates, and the one or more LTL formulas, and wherein the instructions are further executable by the one or more processors to add a second node to the MCTS that includes an update of the environment associated with the snapshot over time.

G. A system as any one of paragraphs A-F recite, the instructions further executable by the one or more processors to: determine that the selected trajectory satisfies the one or more LTL formulas; and determine that the cost associated with the selected trajectory is a lowest cost with respect to trajectories of the one or more candidate trajectories that satisfy the one or more LTL formulas.

H. A system as any one of paragraphs A-G recite, the instructions further executable by the one or more processors to: determine that a candidate trajectory of the one or more candidate trajectories violates, as a violation, the one or more LTL formulas associated with the one or more automaton; and assign a penalty to the candidate trajectory based at least in part on a degree of the violation of the one or more LTL formulas.

I. A method comprising: determining one or more symbols of an environment proximate to an autonomous vehicle; generating a context of the environment based at least in part on the one or more symbols; populating a tree search with one or more candidate trajectories; selecting, as a selected trajectory, a trajectory of the one or more candidate trajectories based at least part on an evaluation of the selected trajectory with respect to one or more temporal logic formulas or on one or more costs; and commanding the autonomous vehicle based at least in part on the selected trajectory.

J. A method as paragraph I recites, further comprising: populating the tree search with a first snapshot of the environment, the first snapshot based at least in part on the environment at a first time; selecting an action based at least in part on the first snapshot and at least one machine learning algorithm; evolving the first snapshot over a time step to generate a second snapshot, the evolving including applying the action to the first snapshot; and adding a node to the tree search based at least in part on the second snapshot, the node representing a speculative snapshot associated with the environment associated with a second time after the first time.

K. A method as paragraph I or J recites, wherein generating the context includes: determining one or more features based at least in part on the one or more symbols; determining one or more predicates based at least in part on the one or more symbols or the one or more features; and determining the one or more temporal logic formulas based at least in part on the one or more symbols, the one or more features, and the one or more predicates.

L. A method as any one of paragraphs I-K recite, further comprising selecting a fallback trajectory to implement in the event of a failure of one or more components of the autonomous vehicle.

M. A method as any one of paragraphs I-L recite, wherein the at least one symbol includes a dynamic symbol representing a vehicle proximate to the automatous vehicle, and wherein the one or more candidate trajectories are based at least in part on a prediction associated with a motion of the dynamic symbol over time.

N. A method as any one of paragraphs I-M recite, further comprising generating one or more automaton based at least in part on the one or more temporal logic formulas, the method further comprising evaluating the one or more candidate trajectories using the one or more automaton, wherein the one or more automaton includes at least one of a Rabin automaton, a Büchi automaton, a Streett automaton, a Parity automaton, or a Muller automaton.

O. A system comprising: one or more processors; and one or more computer readable storage media communicatively coupled to the one or more processors and storing instructions that are executable by the one or more processors to: determine one or more symbols of an environment proximate to an autonomous vehicle; generate a context of the environment based at least in part on the one or more symbols; populate a tree search with one or more candidate trajectories; select, as a selected trajectory, a trajectory of the one or more candidate trajectories based at least part on an evaluation of the selected trajectory with respect to one or more temporal logic formulas or on one or more costs; and command the autonomous vehicle based at least in part on the selected trajectory.

P. A system as paragraph O recites, the instructions further executable by the one or more processors to: populate the tree search with a first snapshot of the environment, the first snapshot based at least in part on the environment at a first time; select an action based at least in part on the first snapshot and at least one machine learning algorithm; evolve the first snapshot over a time step by applying the action to the first snapshot to generate a second snapshot; and add a node to the tree search based at least in part on a termination condition associated with the action, the node representing a speculative snapshot associated with the environment associated with a second time after the first time.

Q. A system as paragraph O or P recites, the instructions further executable by the one or more processors to: determine one or more features based at least in part on the one or more symbols; determine one or more predicates based at least in part on the one or more symbols or the one or more features; and determine the one or more temporal logic formulas based at least in part on the one or more symbols, the one or more features, and the one or more predicates.

R. A system as any one of paragraphs O-Q recite, wherein the temporal logic formulas include at least one of linear temporal logic (LTL) formulas or signal temporal logic (STL) formulas.

S. A system as any one of paragraphs O-R recite, wherein the at least one symbol includes a dynamic symbol representing a vehicle proximate to the automatous vehicle, and wherein the one or more candidate trajectories are based at least in part on a prediction associated with a motion of the dynamic symbol over time.

T. A system as any one of paragraphs O-S recite, the instructions further executable by the one or more processors to: generate one or more automaton based at least in part on the one or more temporal logic formulas; and evaluate the one or more candidate trajectories using the one or more automaton, wherein the one or more automaton includes at least one of a Rabin automaton, a Büchi automaton, a Streett automaton, a Parity automaton, or a Muller automaton.

While the example clauses described above are described with respect to one particular implementation, it should be understood that, in the context of this document, the content of the example clauses can also be implemented via a method, device, system, and/or computer storage media.

What is claimed is:

1. A method comprising:
   receiving, from a machine learned model, an output;
   determining, based at least in part on the output and a progressive widening algorithm, a node to a tree for use in a tree search;
   determining, based at least in part on the tree search, a candidate trajectory associated with traversing an environment;
   determining a cost associated with the candidate trajectory, the cost comprising one or more of a steering cost, an acceleration cost, a travel time cost, a comfort cost, or a lane position cost; and
   controlling, based at least in part on the cost and the candidate trajectory, an autonomous vehicle to traverse the environment.

2. The method of claim 1, further comprising:
   receiving state data associated with the autonomous vehicle, the state data associated with a first time; and
   determining, based at least in part on the tree search, simulated state data associated with a second time after the first time;
   wherein the candidate trajectory is based at least in part on the state data and the simulated state data.

3. The method of claim 2, wherein the state data comprises at least one of:
velocity data;
steering angle data; or
acceleration data.

4. The method of claim 1, wherein the tree search comprises a Monte Carlo Tree Search.

5. The method of claim 1, further comprising:
evaluating the candidate trajectory based at least in part on a temporal logic formula.

6. The method of claim 1, wherein:
the candidate trajectory is a first candidate trajectory;
a first branch associated with the tree search represents the first candidate trajectory; and
a second branch associated with the tree search represents a second candidate trajectory.

7. The method of claim 1, wherein a node associated with the tree search comprises one or more of:
a symbol;
a feature;
a predicate;
a temporal logic symbol; or
an automaton.

8. The method of claim 1, further comprising:
adding the node further based at least in part on the progressive widening algorithm.

9. The method of claim 1, further comprising:
determining that a termination condition associated with a first branch of the tree search is satisfied; and
adding the node to a second branch based at least in part on the termination condition being satisfied.

10. The method of claim 1, further comprising:
adding the node further based at least in part on a driving policy.

11. One or more non-transitory computer-readable media storing instructions that, when executed, cause one or more processors to perform operations comprising:
receiving, from a machine learned model, an output;
determining, based at least in part on the output and a progressive widening algorithm, a node to a tree for use in a tree search;
determining, based at least in part on the tree search, a candidate trajectory associated with traversing an environment;
determining a cost associated with the candidate trajectory, the cost comprising one or more of a steering cost, an acceleration cost, a travel time cost, a comfort cost, or a lane position cost; and
controlling, based at least in part on the cost and the candidate trajectory, an autonomous vehicle to traverse the environment.

12. The one or more non-transitory computer-readable media of claim 11, the operations further comprising:
receiving state data associated with the autonomous vehicle, the state data associated with a first time; and
determining, based at least in part on the tree search, simulated state data associated with a second time after the first time;
wherein the candidate trajectory is based at least in part on the state data and the simulated state data.

13. The one or more non-transitory computer-readable media of claim 12, wherein the state data comprises at least one of:
velocity data;
steering angle data; or
acceleration data.

14. The one or more non-transitory computer-readable media of claim 11, wherein:
the candidate trajectory is a first candidate trajectory;
a first branch associated with the tree search represents the first candidate trajectory; and
a second branch associated with the tree search represents a second candidate trajectory.

15. A system comprising:
one or more processors; and
one or more non-transitory computer-readable media storing computer-executable instructions that, when executed, cause the one or more processors to perform operations comprising:
receiving, from a machine learned model, an output;
determining, based at least in part on the output and a progressive widening algorithm, whether to add a node to a tree used in a tree search;
determining, based at least in part on the tree search, a candidate trajectory associated with traversing an environment;
determining a cost associated with the candidate trajectory, the cost comprising one or more of a steering cost, an acceleration cost, a travel time cost, a comfort cost, or a lane position cost; and
controlling, based at least in part on the cost and the candidate trajectory, an autonomous vehicle to traverse the environment.

16. The system of claim 15, the operations further comprising:
receiving state data associated with the autonomous vehicle, the state data associated with a first time; and
determining, based at least in part on the tree search, simulated state data associated with a second time after the first time;
wherein the candidate trajectory is based at least in part on the state data and the simulated state data.

17. The system of claim 16, wherein the state data comprises at least one of:
velocity data;
steering angle data; or
acceleration data.

18. The system of claim 15, wherein the tree search comprises a Monte Carlo Tree Search.

19. The system of claim 15, the operations further comprising:
evaluating the candidate trajectory based at least in part on a temporal logic formula.

20. The system of claim 15, wherein:
the candidate trajectory is a first candidate trajectory;
a first branch associated with the tree search represents the first candidate trajectory; and
a second branch associated with the tree search represents a second candidate trajectory.

* * * * *